US012785097B2

(12) United States Patent
Yamabayashi et al.

(10) Patent No.: US 12,785,097 B2
(45) Date of Patent: Nov. 3, 2026

(54) PRECURSOR, POSITIVE ELECTRODE ACTIVE MATERIAL FOR LITHIUM SECONDARY BATTERY, POSITIVE ELECTRODE FOR LITHIUM SECONDARY BATTERY, AND LITHIUM SECONDARY BATTERY

(71) Applicant: TANAKA CHEMICAL CORPORATION, Fukui (JP)

(72) Inventors: Tsutomu Yamabayashi, Niihama (JP); Kenji Takamori, Niihama (JP)

(73) Assignee: TANAKA CHEMICAL CORPORATION, Fukui (JP)

( * ) Notice: Subject to any disclaimer, the term of this patent is extended or adjusted under 35 U.S.C. 154(b) by 801 days.

(21) Appl. No.: 18/253,309

(22) PCT Filed: Nov. 18, 2021

(86) PCT No.: PCT/JP2021/042492

§ 371 (c)(1),
(2) Date: May 17, 2023

(87) PCT Pub. No.: WO2022/107861

PCT Pub. Date: May 27, 2022

(65) Prior Publication Data

US 2024/0030430 A1 Jan. 25, 2024

(30) Foreign Application Priority Data

Nov. 19, 2020 (JP) ................................ 2020-192685

(51) Int. Cl.

| | |
|---|---|
| ***H01M 4/525*** | (2010.01) |
| ***C01G 53/00*** | (2025.01) |
| ***C01G 53/504*** | (2025.01) |
| ***C01G 53/506*** | (2025.01) |
| ***C01G 53/84*** | (2025.01) |
| ***H01M 4/505*** | (2010.01) |
| *H01M 4/02* | (2006.01) |

(52) U.S. Cl.

CPC .......... *H01M 4/525* (2013.01); *C01G 53/504* (2025.01); *C01G 53/506* (2025.01); *C01G 53/84* (2025.01); *H01M 4/505* (2013.01); *C01P 2002/52* (2013.01); *C01P 2006/11* (2013.01); *C01P 2006/12* (2013.01); *C01P 2006/14* (2013.01); *C01P 2006/16* (2013.01); *C01P 2006/40* (2013.01); *H01M 2004/021* (2013.01); *H01M 2004/028* (2013.01)

(58) Field of Classification Search

CPC ................ H01M 4/525; H01M 4/505; H01M 2004/021; H01M 2004/028; H01M 4/131; H01M 10/052; C01G 53/50; C01G 53/82; C01P 2002/52; C01P 2006/11; C01P 2006/12; C01P 2006/14; C01P 2006/16; C01P 2006/40; C01P 2002/54; C01P 2002/76; C01P 2004/45; Y02E 60/10

See application file for complete search history.

(56) References Cited

U.S. PATENT DOCUMENTS

| | | | | |
|---|---|---|---|---|
| 2013/0247363 | A1 | 9/2013 | Nelson et al. | |
| 2013/0252085 | A1 | 9/2013 | Nelson et al. | |
| 2014/0131616 | A1 | 5/2014 | Sun et al. | |
| 2014/0147338 | A1 | 5/2014 | Hong et al. | |
| 2015/0155548 | A1 | 6/2015 | Ryoshi et al. | |
| 2016/0133927 | A1 | 5/2016 | Kamata et al. | |
| 2016/0293950 | A1 | 10/2016 | Kamata et al. | |
| 2017/0155144 | A1 | 6/2017 | Yamauchi et al. | |
| 2017/0271653 | A1 | 9/2017 | Yamauchi et al. | |
| 2018/0159127 | A1 * | 6/2018 | Kurita | H01M 4/525 |
| 2018/0277838 | A1 | 9/2018 | Yasumiishi et al. | |
| 2019/0044139 | A1 | 2/2019 | Sakai | |
| 2020/0020931 | A1 * | 1/2020 | Kurita | H01M 4/36 |
| 2020/0083532 | A1 * | 3/2020 | Kageura | H01M 4/505 |
| 2021/0043917 | A1 | 2/2021 | Kurita et al. | |
| 2021/0057746 | A1 | 2/2021 | Inoue et al. | |

(Continued)

FOREIGN PATENT DOCUMENTS

| | | | |
|---|---|---|---|
| CN | 106536418 | A | 3/2017 |
| CN | 106660826 | A | 5/2017 |
| CN | 110462897 | A | 11/2019 |
| EP | 1 391 950 | A1 | 2/2004 |
| EP | 1 667 260 | A1 | 6/2006 |
| EP | 2 104 163 | A1 | 9/2009 |
| EP | 3 242 348 | A1 | 11/2017 |
| JP | 2005-089225 | A | 4/2005 |
| JP | 2005-123179 | A | 5/2005 |
| JP | 2008-166269 | A | 7/2008 |
| JP | 2013-539176 | A | 10/2013 |
| JP | 2014-506388 | A | 3/2014 |
| JP | 5464348 | B2 | 4/2014 |
| JP | 5630593 | B2 | 11/2014 |

(Continued)

OTHER PUBLICATIONS

International Search Report issued in corresponding International Patent Application No. PCT/JP2021/042492, dated Feb. 8, 2022, with English translation.

*Primary Examiner* — Muhammad S Siddiquee
(74) *Attorney, Agent, or Firm* — Rimon P.C.

(57) ABSTRACT

A precursor of a positive electrode active material for a lithium secondary battery, in which a value α that is calculated by a formula (1) is 2.3 m/ng or less. (In the formula (1), A is a cumulative pore specific surface area ($m^2/g$) for which pore diameters are 2.6 nm or more and 200 nm or less among pore specific surface areas that are obtained by analyzing a nitrogen desorption isotherm of the precursor measured at a liquid nitrogen temperature by a BJH method. V is a cumulative pore volume ($cm^3/g$) for which the pore diameters are 2.6 nm or more and 200 nm or less among pore volumes that are obtained by analyzing the nitrogen desorption isotherm of the precursor measured at the liquid nitrogen temperature by the BJH method.)

$$\alpha = A^2/(4\pi V)/1000 \quad (1)$$

20 Claims, 2 Drawing Sheets

(56) References Cited

U.S. PATENT DOCUMENTS

| | | | | |
|---|---|---|---|---|
| 2022/0194814 | A1 * | 6/2022 | Beierling | B01J 4/001 |
| 2022/0376241 | A1 | 11/2022 | Miura | |

FOREIGN PATENT DOCUMENTS

| | | | |
|---|---|---|---|
| JP | 5943051 | B2 | 6/2016 |
| JP | 6044463 | B2 | 12/2016 |
| JP | 2018-506140 | A | 3/2018 |
| JP | 2018-098218 | A | 6/2018 |
| JP | 2018-163762 | A | 10/2018 |
| JP | 2018-170240 | A | 11/2018 |
| JP | 2018-206775 | A | 12/2018 |
| JP | 2019-178025 | A | 10/2019 |
| JP | 6583359 | B2 | 10/2019 |
| WO | 02/086993 | A1 | 10/2002 |
| WO | 2014/203814 | A1 | 12/2014 |
| WO | 2017/135415 | A1 | 8/2017 |
| WO | 2020/026914 | A1 | 2/2020 |
| WO | 2020/207901 | A1 | 10/2020 |
| WO | 2021/054381 | A1 | 3/2021 |

* cited by examiner

PRECURSOR, POSITIVE ELECTRODE ACTIVE MATERIAL FOR LITHIUM SECONDARY BATTERY, POSITIVE ELECTRODE FOR LITHIUM SECONDARY BATTERY, AND LITHIUM SECONDARY BATTERY

CROSS REFERENCE TO RELATED APPLICATIONS

This application is the U.S. National Phase under 35 U.S.C. § 371 of International Application No. PCT/JP2021/042492, filed on Nov. 18, 2021, which claims the benefit of Japanese Application No. 2020-192685, filed on Nov. 19, 2020, the entire contents of each are hereby incorporated by reference.

TECHNICAL FIELD

The present invention relates to a precursor, a positive electrode active material for a lithium secondary battery, a positive electrode for a lithium secondary battery, and a lithium secondary battery.

BACKGROUND ART

As a method for producing a positive electrode active material for a lithium secondary battery, for example, there is a method in which a lithium compound and a precursor containing an element other than lithium are mixed and calcined. As the element other than lithium, for example, nickel, cobalt, and manganese are exemplary examples.

In order to improve the battery characteristics of lithium secondary batteries, for example, Patent Document 1 discloses a technique in which attention is paid to pores in a nickel-cobalt-manganese composite hydroxide, which is a precursor of a positive electrode active material for non-aqueous electrolyte secondary batteries. Specifically, Patent Document 1 describes a nickel-cobalt-manganese composite hydroxide in which the average mesopore radius measured by a nitrogen adsorption method is 4.00 to 6.00 nm and the pore volume is 0.010 to 0.020 ml/g.

In addition, Patent document 2 describes a lithium ion secondary battery in which the pore tortuosity of a positive electrode active material layer is 50 or more and 120 or less. The lithium ion secondary battery described in Patent Document 2 is capable of sufficiently suppressing an increase in resistance of the secondary battery in a low-temperature (for example, −20° C.) environment.

CITATION LIST

Patent Document

[Patent Document 1]
JP-B-6583359
[Patent Document 2]
WO2020/026914

SUMMARY OF INVENTION

Technical Problem

Lithium secondary batteries, which are expected to be rapidly distributed in the future, are required to have a high discharge capacity and to be less likely to deteriorate when stored at high temperatures.

The present invention has been made in view of the above-described circumstances, and an object of the present invention is to provide a precursor that enables the provision of lithium secondary batteries having a high discharge capacity and being less likely to deteriorate during high-temperature storage and serves as a raw material of positive electrode active materials. Furthermore, another object of the present invention is to provide a positive electrode active material for a lithium secondary battery, a positive electrode for a lithium secondary battery, and a lithium secondary battery for which the precursor is used.

Solution to Problem

The present invention includes the following [1] to [11].

[1] A precursor of a positive electrode active material for a lithium secondary battery, containing at least Ni, in which a value α that is calculated by a formula (1) is 2.3 m/ng or less.

$$\alpha = A^2/(4\pi V)/1000 \quad (1)$$

(In the formula (1), A is a cumulative pore specific surface area ($m^2/g$) for which pore diameters are 2.6 nm or more and 200 nm or less among pore specific surface areas that are obtained by analyzing a nitrogen desorption isotherm of the precursor measured at a liquid nitrogen temperature by a BJH method.

V is a cumulative pore volume ($cm^3/g$) for which pore diameters are 2.6 nm or more and 200 nm or less among pore volumes that are obtained by analyzing the nitrogen desorption isotherm of the precursor measured at the liquid nitrogen temperature by the BJH method.)

[2] The precursor according to [1], in which a value β that is calculated by a formula (2) is 2.8 m/ng or less.

$$\beta = B^2/(4\pi X)/1000 \quad (2)$$

(In the formula (2), B is a cumulative pore specific surface area ($m^2/g$) for which pore diameters are 2.6 nm or more and 50 nm or less among the pore specific surface areas that are obtained by analyzing the nitrogen desorption isotherm of the precursor measured at the liquid nitrogen temperature by the BJH method.

X is a cumulative pore volume ($cm^3/g$) for which pore diameters are 2.6 nm or more and 50 nm or less among the pore volumes that are obtained by analyzing the nitrogen desorption isotherm of the precursor measured at the liquid nitrogen temperature by the BJH method.)

[3] The precursor according to [1] or [2], in which a BET specific surface area is 1.0 $m^2/g$ or more and 25 $m^2/g$ or less.

[4] The precursor according to any one of [1] to [3], in which a tap density is 0.8 $g/cm^3$ or more and 2.7 $g/cm^3$ or less.

[5] A positive electrode active material for a lithium secondary battery, containing at least Ni, in which a value γ that is calculated by a formula (3) is 4.0 m/μg or more and 40.0 m/μg or less.

$$\gamma = C^2/(4\pi Y) \quad (3)$$

(In the formula (3), C is a cumulative pore specific surface area ($m^2/g$) for which pore diameters are 2.6 nm or more and 200 nm or less among pore specific surface areas that are obtained by analyzing a nitrogen desorption isotherm of the positive electrode active material for the lithium secondary battery measured at a liquid nitrogen temperature by a BJH method.

Y is a cumulative pore volume ($cm^3/g$) for which pore diameters are 2.6 nm or more and 200 nm or less among pore volumes that are obtained by analyzing the nitrogen desorption isotherm of the positive electrode active material for the lithium secondary battery measured at the liquid nitrogen temperature by the BJH method.)

[6] The positive electrode active material for the lithium secondary battery according to [5], in which a value δ that is calculated by a formula (4) is 10 m/μg or more and 50 m/μg or less.

$$\delta = E^2/(4\pi Z) \quad (4)$$

(In the formula (4), E is a cumulative pore specific surface area ($m^2/g$) for which pore diameters are 2.6 nm or more and 50 nm or less among the pore specific surface areas that are obtained by analyzing the nitrogen desorption isotherm of the positive electrode active material for the lithium secondary battery measured at the liquid nitrogen temperature by the BJH method.

Z is a cumulative pore volume ($cm^3/g$) for which pore diameters are 2.6 nm or more and 50 nm or less among the pore volumes that are obtained by analyzing the nitrogen desorption isotherm of the positive electrode active material for the lithium secondary battery measured at the liquid nitrogen temperature by the BJH method.)

[7] The positive electrode active material for the lithium secondary battery according to [5] or [6] that is represented by a composition formula (I).

$$Li[Li_a(Ni_{1-x-y}Co_xM_y)_{1-a}]O_2 \quad (I)$$

(Here, in the formula (I), M is at least one element selected from the group consisting of Fe, Cu, Mg, Mn, Al, W, B, Mo, Zn, Sn, Zr, Ga, La, Ti, Nb, and V and $-0.10 \le a \le 0.30$, $0 \le x \le 0.45$, and $0 \le y \le 0.45$ are satisfied.)

[8] The positive electrode active material for the lithium secondary battery according to any one of [5] to [7], in which a BET specific surface area is 0.3 $m^2/g$ or more and 4.0 $m^2/g$ or less.

[9] The positive electrode active material for the lithium secondary battery according to any one of [5] to [8], in which a tap density is 1.0 $g/cm^3$ or more and 2.8 $g/cm^3$ or less.

[10] A positive electrode for a lithium secondary battery, containing the positive electrode active material for the lithium secondary battery according to any one of [5] to [9].

[11] A lithium secondary battery having the positive electrode for the lithium secondary battery according to [10].

Advantageous Effects of Invention

According to the present invention, it is possible to provide a precursor that enables the provision of lithium secondary batteries having a high discharge capacity and being less likely to deteriorate during high-temperature storage and serves as a raw material of positive electrode active materials. Furthermore, it is possible to provide a positive electrode active material for a lithium secondary battery, a positive electrode for a lithium secondary battery, and a lithium secondary battery for which the precursor is used.

DESCRIPTION OF EMBODIMENTS

Figure 1A:
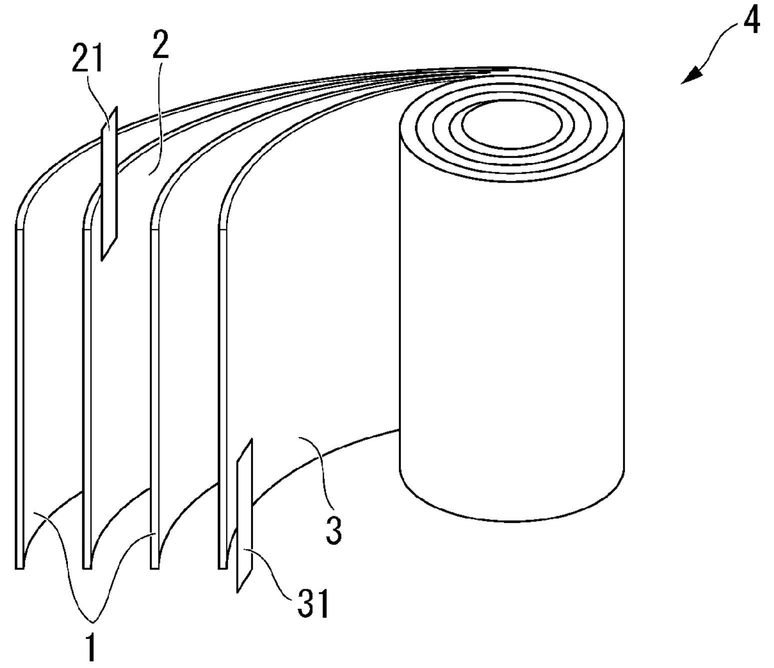
FIG. 1A is a schematic configuration view showing an example of a lithium secondary battery.

Hereinafter, a positive electrode active material for a lithium secondary battery of the present embodiment will be referred to as the "positive electrode active material" in some cases.

Hereinafter, a positive electrode active material for a lithium secondary battery will be referred to as "CAM" as an abbreviation for a cathode active material for a lithium secondary battery in some cases.

In the present specification, the height of the discharge capacity and the degree of deterioration during high-temperature storage are evaluated by the following method.

[High-Temperature Storage Test]

At a testing temperature of 25° C., the set current value is set to 0.2 CA, and each of constant-current constant-voltage charging and constant-current discharging is performed using a lithium secondary battery. The maximum charge voltage is set to 4.3 V, and the minimum discharge voltage is set to 2.5 V. The discharge capacity is measured, and the obtained value is defined as the "discharge capacity before storage". When the discharge capacity before storage is 180 mAh/g or more, "the discharge capacity" is evaluated as "high".

Next, the lithium secondary battery of which the discharge capacity before storage has been measured is constant-current constant-voltage charged again up to 4.3 V at a set current value of 0.2 CA. The lithium secondary battery in a charged state is stored in an environment of 60° C. for 7 days, and then constant-current discharged at a set constant value of 0.2 CA at a testing temperature of 25° C., and the discharge capacity is measured. This discharge capacity is defined as the "discharge capacity after storage". The storage capacity retention rates before and after high-temperature storage are calculated from the discharge capacity before storage and the discharge capacity after storage. When the storage capacity retention rate is 85% or more, the lithium secondary battery is evaluated as "being less likely to deteriorate during high-temperature storage".

[Composition Analyses of Precursor and CAM]

The composition analyses of a precursor and CAM can be measured using an ICP emission spectrometer after dissolving the powder of each of the precursor and CAM in hydrochloric acid.

As the ICP emission spectrometer, for example, Optima 7300 manufactured by Perkin Elmer Inc. can be used.

[Measurement of BET Specific Surface Area of Precursor and CAM]

The BET specific surface area of the precursor or CAM can be measured with a BET specific surface area measuring device. Specifically, the BET specific surface area (unit: $m^2/g$) may be measured, for example, using Macsorb (registered trademark) manufactured by Mountech Co., Ltd. after drying 1 g of the powder of the precursor or CAM in a nitrogen atmosphere at 105° C. for 30 minutes.

[Measurement of Tap Density of Precursor and CAM]

As the tap density, a value obtained by the method described in JIS R 1628-1997 is used.

<Precursor>

The present embodiment is a precursor of CAM. The precursor contains at least Ni.

The precursor serves as a raw material of CAM. Hereinafter, the term "precursor" means the precursor of the present embodiment.

Hereinafter, in a plurality of embodiments or numerical ranges, preferable examples or conditions may be shared.

In the present specification, Ni refers not to a nickel metal but to a nickel atom, and Co, Mn, Li, and the like also, similarly, each refer to a cobalt atom, a manganese atom, a lithium atom, or the like.

In one aspect of the present embodiment, the precursor is composed of primary particles and secondary particles that are each an aggregate of primary particles.

In one aspect of the present embodiment, the precursor is a powder.

In one aspect of the present embodiment, the precursor contains at least Ni.

The precursor has a value α that is calculated by the following formula (1) of 2.3 m/ng or less.

$$\alpha = A^2/(4\pi V)/1000 \quad (1)$$

(In the formula (1), A is a cumulative pore specific surface area ($m^2$/g) for which pore diameters are 2.6 nm or more and 200 nm or less among pore specific surface areas that are obtained by analyzing a nitrogen desorption isotherm of the precursor measured at a liquid nitrogen temperature by a BJH method.

V is a cumulative pore volume ($cm^3$/g) for which pore diameters are 2.6 nm or more and 200 nm or less among pore volumes that are obtained by analyzing the nitrogen desorption isotherm of the precursor measured at the liquid nitrogen temperature by the BJH method.)

[Method for Measuring A and V]

In the formula (1), A and V are obtained by the following measurement method.

(Nitrogen Adsorption Isotherm Measurement and Nitrogen Desorption Isotherm Measurement)

First, the precursor is degassed in a vacuum at 80° C. for 8 hours using a vacuum heating treatment device.

As the vacuum heating treatment device, for example, BELSORP-vacII manufactured by MicrotracBEL Corp. can be used.

After that, the nitrogen desorption isotherm and nitrogen adsorption isotherm at the liquid nitrogen temperature (77 K) of the precursor are measured using the vacuum heating treatment device. Specifically, nitrogen is gradually injected from the initial state under a vacuum, and the amount of nitrogen adsorbed is calculated by a constant volume method from a change in the pressure of nitrogen due to the adsorption using the above-described vacuum heating treatment device. This makes it possible to obtain an adsorption isotherm of nitrogen from 0 atm to 1 atm at the liquid nitrogen temperature. After the atmospheric pressure is reached, nitrogen is gradually reduced, and a desorption isotherm from 1 atm to 0 atm is obtained.

As a nitrogen adsorption isotherm device and a nitrogen desorption isotherm measuring device, for example, BELSORP-mini manufactured by MicrotracBEL Corp. can be used.

The amount of nitrogen adsorbed per unit weight of the precursor on the nitrogen adsorption isotherm is calculated so as to be expressed as the volume of gaseous nitrogen at the standard temperature and pressure (STP).

The amount of nitrogen desorbed per unit weight of the precursor on the desorption isotherm is calculated so as to be expressed as the volume of gaseous nitrogen at the standard temperature and pressure (STP).

The obtained nitrogen desorption isotherm is analyzed by a BJH method (Barrett-Joyner-Halenda method). The BJH method is a method for calculating pore diameter distribution using cylindrical pores as a model.

Analysis of the nitrogen desorption isotherm by the BJH method makes it possible to obtain the pore volume and the pore specific surface area at each pore diameter when pores are assumed to be cylindrical.

For example, for a cylindrical pore having a diameter of D (cm) and a height (that is, the length of the pore) of h (cm), the pore volume L ($cm^3$/g) is $L=D^2\pi h/4$. The pore specific surface area S ($cm^2$/g) is $S=D\pi h$.

In addition, the diameter D of the cylindrical shape is 4L/S. Here, the "pore specific surface area" means the surface area of only the side surfaces of cylindrical pores per unit mass.

From these formulas, the height (that is, the length of the pore) h of the cylindrical shape can be obtained by the following formula (H) from the pore volume L ($cm^3$/g) and the pore specific surface area S ($cm^2$/g).

$$h = S^2/4\pi L \quad (H)$$

A value α that is calculated by the formula (1) from A, which is the cumulative pore specific surface area ($m^2$/g) for which the pore diameters are 2.6 nm or more and 200 nm or less when pores are assumed to be cylindrical, and V, which is the cumulative pore volume ($cm^3$/g) for which the pore diameters are 2.6 nm or more and 200 nm or less when pores are assumed to be cylindrical, by the same method as the formula (H) means the length of pores per unit mass (m/ng).

α is 2.3 m/ng or less, preferably 2.0 m/ng or less, and more preferably 1.8 m/ng or less.

When α is the above-described upper limit value or less, it means that there is a simple pore path in a model where pores are assumed to be cylindrical.

The precursor having α of the above-described upper limit value or less, that is, the precursor having relatively short pore lengths per unit mass, can be assumed to have a simple pore path. The simple pore path means a pore path where there are no complex branched pore paths inside the particles. In CAM produced using the precursor having α of the above-described upper limit value or less as a raw material, the same simple pore path as in the precursor is likely to be maintained.

In such CAM, even when an electrolyte solution decomposes to generate gas in the pores, it is conceivable that the pores are less likely to be clogged. Therefore, CAM is likely to maintain the lithium ion conductivity even in the case of being stored under a high-temperature condition of 60° C. or higher where the decomposition reaction of the electrolyte solution is expected.

Therefore, lithium secondary battery for which CAM produced using a precursor having α of the above-described upper limit value or less as a raw material is used are considered to have a high discharge capacity and be less likely to deteriorate during high-temperature storage.

The lower limit value of α is, for example, 0.1 m/ng or more, 0.2 m/ng or more, or 0.3 m/ng or more.

The upper limit value and lower limit value of a can be randomly combined together.

As examples of the combination, α of 0.1 m/ng or more and 2.3 m/ng or less, 0.2 m/ng or more and 2.0 m/ng or less, and 0.3 m/ng or more and 1.8 m/ng or less are exemplary examples.

The precursor having α of the above-described lower limit value or more is considered to have an appropriate pore path inside the particles. CAM produced using such a precursor as a raw material is considered to have an appropriate pore path inside the particles. Lithium secondary batteries for which such CAM is used are considered to have a high discharge capacity. The reason therefor is that the diffusion distance of lithium ions in the particles of CAM becomes short in CAM having a pore path compared with CAM having no pore paths.

A is preferably 5 $m^2/g$ or more and 55 $m^2/g$ or less and more preferably 10 $m^2/g$ or more and 50 $m^2/g$ or less.

V is preferably 0.010 $cm^3/g$ or more and 0.11 $cm^3/g$ or less and more preferably 0.015 $cm^3/g$ or more and 0.10 $cm^3/g$ or less.

The precursor has a value β that is calculated by the following formula (2) of 2.8 m/ng or less.

$$\beta = B^2/(4\pi X)/1000 \quad (2)$$

(In the formula (2), B is a cumulative pore specific surface area ($m^2/g$) for which pore diameters are 2.6 nm or more and 50 nm or less among the pore specific surface areas that are obtained by analyzing the nitrogen desorption isotherm of the precursor measured at the liquid nitrogen temperature by the BJH method.

X is a cumulative pore volume ($cm^3/g$) for which pore diameters are 2.6 nm or more and 50 nm or less among the pore volumes that are obtained by analyzing the nitrogen desorption isotherm of the precursor measured at the liquid nitrogen temperature by the BJH method.)

[Method for Measuring B and X]

A method for measuring B and X is the same as the method for measuring A and V in the formula (1).

β is 2.8 m/ng or less, preferably 2.7 m/ng or less, and more preferably 2.5 m/ng or less.

In the precursor having β of the above-described upper limit value, pores having a pore diameter of 2.6 nm or more and 50 nm or less (hereinafter, referred to as mesopores in some cases) can be assumed to have a simple pore path. In CAM produced using this precursor as a raw material, it is conceivable that the mesopores have a simple pore path. The mesopores are more likely to be clogged by gas or the like.

CAM produced using the precursor having β of the above-described upper limit value or less as a raw material is less likely to be clogged since the pore path of the mesopores is simple. Therefore, it becomes easier to maintain the lithium ion conductivity of CAM.

Therefore, lithium secondary batteries for which CAM produced using the precursor as a raw material are more less likely to deteriorate in the case of being stored at high temperatures.

The lower limit value of β is, for example, 0.1 m/ng or more, 0.2 m/ng or more, or 0.3 m/ng or more.

The upper limit value and lower limit value of β can be randomly combined together.

As examples of the combination, β of 0.1 m/ng or more and 2.8 m/ng or less, 0.2 m/ng or more and 2.7 m/ng or less, and 0.3 m/ng or more and 2.5 m/ng or less are exemplary examples.

The precursor having β of the above-described lower limit value or more is assumed to have an appropriate pore path inside the particles. CAM produced using such a precursor as a raw material is considered to have an appropriate pore path inside the particles. Lithium secondary batteries for which such CAM is used are assumed to have a high discharge capacity. The reason therefor is considered that the diffusion distance of lithium ions in the particles of CAM becomes shorter in CAM having a pore path than in CAM having no pore paths.

B is preferably 5 $m^2/g$ or more and 58 $m^2/g$ or less, more preferably 5 $m^2/g$ or more and 50 $m^2/g$ or less, and still more preferably 10 $m^2/g$ or more and 45 $m^2/g$ or less.

X is preferably 0.01 $cm^3/g$ or more and 0.09 $cm^3/g$ or less and more preferably 0.02 $cm^3/g$ or more and 0.08 $cm^3/g$ or less.

The cumulative pore volume for which the pore diameters of the precursor are 10 nm or more and 200 nm or less is preferably 0.010 $cm^3/g$ or more and 0.08 $cm^3/g$ or less, more preferably 0.010 $cm^3/g$ or more and 0.075 $cm^3/g$ or less, and still more preferably 0.011 $cm^3/g$ or more and 0.070 $cm^3/g$ or less.

In CAM produced using the precursor having a cumulative pore volume for which the pore diameters are 10 nm or more and 200 nm or less within the above-described range as a raw material, electrolytes easily enter the inside of the pores. Therefore, it is conceivable that the diffusion path of lithium ions becomes short and the discharge capacities of lithium secondary batteries increase.

The cumulative pore specific surface area for which the pore diameters of the precursor are 10 nm or more and 200 nm or less is preferably 0.80 $m^2/g$ or more and 10 $m^2/g$ or less, more preferably 0.80 $m^2/g$ or more and 9.0 $m^2/g$ or less, and still more preferably 0.90 $m^2/g$ or more and 8.0 $m^2/g$ or less.

In CAM produced using the precursor having a cumulative pore specific surface area for which the pore diameters are 10 nm or more and 200 nm or less within the above-described range as a raw material, the surface area of the particles is small. CAM in which the surface area of the particles is small has a small area where CAM is capable of reacting with electrolyte solutions. It is conceivable that such CAM is less likely to deteriorate in the case of being stored at high temperatures. In addition, the precursor having the cumulative pore specific surface area within the above-described range is likely to react with lithium raw materials. Therefore, it is easy to obtain CAM capable of increasing the discharge capacities of lithium secondary batteries.

A method for measuring the cumulative pore volume and cumulative pore specific surface area of the precursor for which the pore diameters are 10 nm or more and 200 nm or less is the same as the method for measuring A and V in the formula (1).

The BET specific surface area of the precursor is preferably 1.0 $m^2/g$ or more and 25 $m^2/g$ or less, more preferably 1.0 $m^2/g$ or more and 23 $m^2/g$ or less, still more preferably 2.0 $m^2/g$ or more and 22 $m^2/g$ or less, and particularly preferably 3.0 $m^2/g$ or more and 21 $m^2/g$ or less.

In CAM produced using the precursor having the BET specific surface area within the above-described range as a raw material, the surface area of the particles is small. CAM in which the surface area of the particles is small has a small area where CAM is capable of reacting with electrolyte solutions. It is conceivable that such CAM is less likely to deteriorate in the case of being stored at high temperatures. In addition, the precursor having the BET specific surface area within the above-described range is likely to react with lithium compounds. Therefore, it is easy to obtain CAM that makes the discharge capacities of lithium secondary batteries high.

The tap density of the precursor is preferably 0.8 $g/cm^3$ or more and 2.7 $g/cm^3$ or less, more preferably 0.9 $g/cm^3$ or more and 2.7 $g/cm^3$ or less, still more preferably 1.0 $g/cm^3$ or more and 2.6 $g/cm^3$ or less, and particularly preferably 1.0 $g/cm^3$ or more and 2.5 $g/cm^3$ or less.

CAM produced using the precursor having the tap density of the above-described lower limit value or more as a raw material has a high density and is thus capable of increasing the energy densities of lithium secondary batteries. In addition, the precursor having the tap density of the above-described upper limit value or more is considered to appropriately have pores inside the particles. CAM produced using such a precursor as a raw material is likely to have appropriate pores inside the particles. Lithium secondary batteries for which such CAM is used are considered to have a high discharge capacity. The reason therefor is considered that the diffusion distance of lithium ions in the particles of CAM becomes short in CAM having pores compared with CAM having no pores.

Composition Formula (A)

It is preferable that the precursor contains at least Ni and is represented by the following composition formula (A). The precursor represented by the following composition formula (A) is an oxide or a hydroxide and preferably a hydroxide.

$$Ni_{1-x-y}Co_xM_yO_z(OH)_{2-b} \quad \text{Composition Formula (A)}$$

(In the composition formula (A), $0 \le x \le 0.45$, $0 \le y \le 0.45$, $0 \le z \le 3$, $-0.5 \le b \le 2$, and M is at least one element selected from the group consisting of Fe, Cu, Mg, Mn, Al, W, B, Mo, Zn, Sn, Zr, Ga, La, Ti, Nb, and V.)

x x is preferably 0.005 or more, more preferably 0.01 or more, still more preferably 0.02 or more, and particularly preferably 0.05 or more.

In addition, x is preferably 0.44 or less, more preferably 0.40 or less, still more preferably 0.35 or less, and particularly preferably 0.30 or less.

The upper limit value and lower limit value of x can be randomly combined together.

As examples of the combination, $0 \le x \le 0.40$, $0.01 \le x \le 0.44$, $0.02 \le x \le 0.30$, $0.03 \le x \le 0.40$, and $0.05 \le x \le 0.35$ are exemplary examples.

y y is preferably 0.01 or more, more preferably 0.02 or more, still more preferably 0.03 or more, and particularly preferably 0.1 or more.

In addition, y is preferably 0.44 or less, more preferably 0.42 or less, still more preferably 0.40 or less, and particularly preferably 0.35 or less.

The upper limit value and lower limit value of y can be randomly combined together.

As the combination, y is preferably $0.01 \le y \le 0.44$, more preferably $0.02 \le y \le 0.42$, still more preferably $0.03 \le y \le 0.40$, and particularly preferably $0.1 \le y \le 0.35$.

z z is preferably 0.1 or more, more preferably 0.2 or more, and particularly preferably 0.3 or more.

In addition, z is preferably 2.9 or less, more preferably 2.8 or less, and still more preferably 2.7 or less.

The upper limit value and lower limit value of z can be randomly combined together.

As an example of the combination, z is preferably $0.1 \le z \le 2.9$, more preferably $0.2 \le z \le 2.8$, and particularly preferably $0.3 \le z \le 2.7$.

b b is preferably −0.45 or more, more preferably −0.4 or more, and still more preferably −0.35 or more.

In addition, b is preferably 1.8 or less, more preferably 1.6 or less, and still more preferably 1.4 or less.

The upper limit value and lower limit value of b can be randomly combined together.

As an example of the combination, b is preferably $-0.45 \le b \le 1.8$, more preferably $-0.4 \le b \le 1.6$, and particularly preferably $-0.35 \le b \le 1.4$.

x+y x+y is preferably 0.05 or more and 0.70 or less and more preferably 0.10 or more and 0.50 or less.

M

In the composition formula (A), from the viewpoint of obtaining a lithium secondary battery having high cycle characteristics, M is preferably one or more elements selected from the group consisting of Mn, Mg, Al, W, B, and Zr and more preferably one or more elements selected from the group consisting of Zr, Al, and M.

<CAM>

CAM of the present embodiment can be obtained by mixing and calcining the above-described precursor and a lithium compound.

In one aspect of the present embodiment, CAM is composed of primary particles and secondary particles that are each an aggregate of primary particles.

In one aspect of the present embodiment, CAM is a powder.

In CAM, the value γ that is calculated by the following formula (3) is 4.0 m/μg or more and 40.0 m/μg or less.

$$\gamma = C^2/(4\pi Y) \quad (3)$$

(In the formula (3), C is a cumulative pore specific surface area ($m^2/g$) for which pore diameters are 2.6 nm or more and 200 nm or less among pore specific surface areas that are obtained by analyzing a nitrogen desorption isotherm of CAM measured at the liquid nitrogen temperature by the BJH method.

Y is a cumulative pore volume ($cm^3/g$) for which pore diameters are 2.6 nm or more and 200 nm or less among pore volumes that are obtained by analyzing the nitrogen desorption isotherm of CAM measured at the liquid nitrogen temperature by the BJH method.)

[Method for Measuring C and Y]

C and Y are obtained by the following measurement.

First, CAM is degassed in a vacuum at a temperature of 150° C. for 8 hours using a vacuum heating treatment device.

As the vacuum heating treatment device, for example, BELSORP-vacII manufactured by MicrotracBEL Corp. can be used.

After the vacuum degassing, the same operation as in the measurement method described in the above-described section (Nitrogen adsorption isotherm measurement and nitrogen desorption isotherm measurement) is performed to measure C and Y.

γ is 4.0 m/μg or more and 40.0 m/μg or less, preferably 5.0 m/μg or more and 30.0 m/μg or less, and more preferably 6.0 m/μg or more and 25.0 m/μg or less.

When γ is the above-described upper limit value or less, it means that CAM has a simple pore path in a model where pores are assumed to be cylindrical.

CAM having γ of the above-described upper limit value or less, that is, CAM having relatively short pore lengths per unit mass, can be assumed to have a simple pore shape. In such CAM, in a case where an electrolyte solution has decomposed to generate gas in the pores, the pores are less likely to be clogged. Therefore, CAM is likely to maintain the lithium ion conductivity even in the case of being stored under a high-temperature condition of 60° C. or higher where the decomposition reaction of the electrolyte solution is expected.

Therefore, lithium secondary battery for which CAM having γ of the above-described upper limit value or less is used are considered to have a high discharge capacity and be less likely to deteriorate during high-temperature storage.

On the other hand, CAM having $\gamma$ of the above-described lower limit value or more is likely to have an appropriate pore path inside the particles. Lithium secondary batteries for which such CAM is used are considered to have a high discharge capacity. The reason therefor is considered that the diffusion distance of lithium ions in the particles of CAM becomes shorter in CAM having a pore path than in CAM having no pore paths.

C is preferably 0.3 $m^2/g$ or more and 5.0 $m^2/g$ or less and more preferably 0.4 $m^2/g$ or more and 4.5 $m^2/g$ or less.

Y is preferably 0.002 $cm^3/g$ or more and 0.050 $cm^3/g$ or less and more preferably 0.005 $cm^3/g$ or more and 0.040 $cm^3/g$ or less.

In CAM, the value $\delta$ that is calculated by the following formula (4) is 10 m/μg or more and 50 m/μg or less.

$$\delta=E^2/(4\pi Z) \quad (4)$$

(In the formula (4), E is a cumulative pore specific surface area ($m^2/g$) for which pore diameters are 2.6 nm or more and 50 nm or less among the pore specific surface areas that are obtained by analyzing the nitrogen desorption isotherm of CAM measured at the liquid nitrogen temperature by the BJH method.

Z is a cumulative pore volume ($cm^3/g$) for which pore diameters are 2.6 nm or more and 50 nm or less among the pore volumes that are obtained by analyzing the nitrogen desorption isotherm of CAM measured at the liquid nitrogen temperature by the BJH method.)

[Method for Measuring E and Z]

A method for measuring E and Z is the same as the measurement method described in the above-described section (Nitrogen adsorption isotherm measurement and nitrogen desorption isotherm measurement).

$\delta$ is 10 m/μg or more and 50 m/μg or less and preferably 11 m/μg or more and 45 m/μg or less.

E is preferably 0.3 $m^2/g$ or more and 3.0 $m^2/g$ or less and more preferably 0.4 $m^2/g$ or more and 2.5 $m^2/g$ or less.

Z is preferably 0.0010 $cm^3/g$ or more and 0.010 $cm^3/g$ or less and more preferably 0.0020 $cm^3/g$ or more and 0.0090 $cm^3/g$ or less.

Mesopores in CAM are easily clogged. In CAM having $\delta$ of the above-described upper limit value or less, the mesopores can be assumed to have a simple pore path. In such CAM, even when an electrolyte solution decomposes to generate gas in the mesopores, it is conceivable that the pores are less likely to be clogged. Therefore, CAM is likely to maintain the lithium ion conductivity even in the case of being stored under a high-temperature condition of 60° C. or higher where the decomposition reaction of the electrolyte solution is expected. Therefore, lithium secondary battery for which CAM is used are considered to be less likely to deteriorate during high-temperature storage.

On the other hand, CAM having $\delta$ of the above-described lower limit value or more is likely to have an appropriate pore path inside the particles. Lithium secondary batteries for which such CAM is used are considered to have a high discharge capacity. The reason therefor is considered that the diffusion distance of lithium ions in the particles of CAM becomes shorter in CAM having a pore path than in CAM having no pore paths.

The cumulative pore volume for which the pore diameters of CAM are 10 nm or more and 200 nm or less is preferably 0.002 $cm^3/g$ or more and 0.050 $cm^3/g$ or less, more preferably 0.003 $cm^3/g$ or more and 0.030 $cm^3/g$ or less, still more preferably 0.004 $cm^3/g$ or more and 0.020 $cm^3/g$ or less, and particularly preferably 0.005 $cm^3/g$ or more and less than 0.010 $cm^3/g$.

In CAM having the cumulative pore volume for which the pore diameters are 10 nm or more and 200 nm or less within the above-described range, electrolytes easily enter the inside of the pores. Therefore, it is conceivable that the diffusion path of lithium ions becomes short and the discharge capacities of lithium secondary batteries increase.

The cumulative pore specific surface area for which the pore diameters of CAM are 10 nm or more and 200 nm or less is preferably 0.20 $m^2/g$ or more and 2.5 $m^2/g$ or less, preferably 0.25 $m^2/g$ or more and 2.0 $m^2/g$ or less, and more preferably 0.3 $m^2/g$ or more and 1.5 $m^2/g$ or less.

In CAM having the cumulative pore specific surface area for which the pore diameters are 10 nm or more and 200 nm or less within the above-described range, the surface area of the particles is small. CAM in which the surface area of the particles is small has a small area where CAM is capable of reacting with electrolyte solutions. Therefore, it is conceivable that CAM is less likely to deteriorate in the case of being stored at high temperatures. In addition, the precursor having the cumulative pore specific surface area within the above-described range is likely to react with lithium raw materials. Therefore, it is easy to obtain CAM capable of increasing the discharge capacities of lithium secondary batteries.

A method for measuring the cumulative pore volume and cumulative pore specific surface area of CAM for which the pore diameters are 10 nm or more and 200 nm or less is the same as the method for measuring C and Y in the formula (3).

The BET specific surface area of CAM is preferably 0.3 $m^2/g$ or more and 4.0 $m^2/g$ or less. The lower limit value of the BET specific surface area is more preferably 0.4 $m^2/g$ or more, still more preferably 0.5 $m^2/g$ or more, and particularly preferably 0.6 $m^2/g$ or more. In addition, the upper limit value of the BET specific surface area is more preferably 3.5 $m^2/g$ or less, still more preferably 3.0 $m^2/g$ or less, and particularly preferably 2.8 $m^2/g$ or less.

The above-described upper limit value and the above-described lower limit value can be randomly combined together. As examples of the combination, the BET specific surface areas of 0.3 $m^2/g$ or more and 3.5 $m^2/g$ or less, 0.5 $m^2/g$ or more and 3.0 $m^2/g$ or less, and 0.6 $m^2/g$ or more and 2.8 $m^2/g$ or less are exemplary examples.

CAM having the BET specific surface area of the above-described upper limit value or less has a small surface area and is less likely to react with electrolyte solutions. Therefore, lithium secondary battery for which such CAM is used are less likely to deteriorate during high-temperature storage.

In addition, CAM having the BET specific surface area of the above-described lower limit value or more has a large reaction area with lithium ions. Therefore, lithium secondary batteries for which such CAM is used are considered to have a high discharge capacity.

The tap density of CAM is preferably 1.0 $g/cm^3$ or more and 2.8 $g/cm^3$ or less. The lower limit value of the tap density is more preferably 1.1 $g/cm^3$ or more and still more preferably 1.2 $g/cm^3$ or more. In addition, the upper limit value of the tap density is more preferably 2.5 $g/cm^3$ or less and still more preferably 2.3 $g/cm^3$ or less.

The above-described upper limit value and the above-described lower limit value can be randomly combined together. As examples of the combination, tap densities of 1.1 $g/cm^3$ or more and 2.8 $g/cm^3$ or less, 1.2 $g/cm^3$ or more and 2.5 $g/cm^3$ or less, and 1.2 $g/cm^3$ or more and 2.3 $g/cm^3$ or less are exemplary examples.

Positive electrodes for which CAM having the tap density of the above-described lower limit value or more is used have a high density and is capable of increasing the energy densities of lithium secondary batteries. In addition, the particles of CAM having the tap density of the above-described upper limit value or less are considered to appropriately have pores and be appropriately dense. Lithium secondary batteries for which such CAM is used are considered to have a high discharge capacity. The reason therefor is considered that the diffusion distance of lithium ions in the particles of CAM becomes shorter in CAM having pores than in CAM having no pores.

It is preferable that CAM contains at least Ni and is represented by the following composition formula (I).

$$Li[Li_a(Ni_{1-x-y}Co_xM_y)_{1-a}]O_2 \quad (I)$$

(Here, M is at least one element selected from the group consisting of Fe, Cu, Mg, Mn, Al, W, B, Mo, Zn, Sn, Zr, Ga, La, Ti, Nb, and V and $-0.10 \le a \le 0.30$, $0 \le x \le 0.45$, and $0 \le y \le 0.45$ are satisfied.)

(a)

From the viewpoint of obtaining a lithium secondary battery having favorable cycle characteristics, a in the composition formula (I) is preferably more than 0, more preferably 0.01 or more, and still more preferably 0.02 or more. In addition, a in the composition formula (I) is preferably 0.25 or less and more preferably 0.10 or less.

In the present specification, the expression "cycle characteristics are favorable" means a characteristic in which the amount of the battery capacity decreased by the repetition of charging and discharging is low, and means that the ratio of the capacity when measured again to the initial capacity is unlikely to decrease.

The upper limit value and the lower limit value of a can be randomly combined together. In the composition formula (I), a may be −0.10 or more and 0.25 or less and may be −0.10 or more and 0.10 or less.

a may be more than 0 and 0.30 or less, may be more than 0 and 0.25 or less, and may be more than 0 and 0.10 or less.

a may be 0.01 or more and 0.30 or less, may be 0.01 or more and 0.25 or less, and may be 0.01 or more and 0.10 or less.

a may be 0.02 or more and 0.3 or less, may be 0.02 or more and 0.25 or less, and may be 0.02 or more and 0.10 or less.

a preferably satisfies $0 < a \le 0.30$.

(x)

x in the composition formula (I) is preferably 0.005 or more, more preferably 0.01 or more, still more preferably 0.02 or more, and particularly preferably 0.05 or more. In addition, x in the composition formula (I) is preferably 0.44 or less, more preferably 0.40 or less, still more preferably 0.35 or less, and particularly preferably 0.30 or less.

The upper limit value and lower limit value of x can be randomly combined together. In the composition formula (I), x may be 0 or more and 0.35 or less, may be 0 or more and 0.44 or less, and may be 0 or more and 0.30 or less.

x may be 0 or more and 0.40 or less, may be 0 or more and 0.35 or less, may be 0 or more and 0.44 or less, and may be 0 or more and 0.30 or less.

x may be 0.005 or more and 0.40 or less, may be 0.005 or more and 0.35 or less, may be 0.005 or more and 0.44 or less, and may be 0.005 or more and 0.30 or less.

x may be 0.01 or more and 0.40 or less, may be 0.01 or more and 0.35 or less, may be 0.01 or more and 0.44 or less, and may be 0.01 or more and 0.30 or less.

x may be 0.05 or more and 0.40 or less, may be 0.05 or more and 0.35 or less, may be 0.05 or more and 0.44 or less, and may be 0.05 or more and 0.30 or less.

In composition formula (I), $0 < a \le 0.10$ and $0 \le x \le 0.40$ are more preferable.

(y)

In addition, from the viewpoint of obtaining lithium secondary batteries having high cycle characteristics, y in the composition formula (I) is preferably 0.01 or more, more preferably 0.02 or more, still more preferably 0.03 or more, and particularly preferably 0.1 or more. In addition, y in the composition formula (I) is preferably 0.44 or less, more preferably 0.42 or less, still more preferably 0.40 or less, and particularly preferably 0.35 or less.

The upper limit value and lower limit value of y can be randomly combined together. In the composition formula (I), z may be 0 or more and 0.44 or less, may be 0 or more and 0.42 or less and may be 0 or more and 0.35 or less.

y may be 0.01 or more and 0.40 or less, may be 0.01 or more and 0.44 or less, may be 0.01 or more and 0.42 or less, and may be 0.01 or more and 0.35 or less.

y may be 0.02 or more and 0.40 or less, may be 0.02 or more and 0.44 or less, may be 0.02 or more and 0.42 or less, and may be 0.02 or more and 0.35 or less.

y may be 0.10 or more and 0.40 or less, may be 0.10 or more and 0.44 or less, may be 0.1 or more and 0.42 or less, and may be 0.1 or more and 0.35 or less.

(M)

M in the composition formula (I) represents one or more elements selected from the group consisting of Fe, Cu, Mg, Mn, Al, W, B, Mo, Zn, Sn, Zr, Ga, La, Ti, Nb, and V.

In addition, from the viewpoint of obtaining a lithium secondary battery having high cycle characteristics, M in the composition formula (I) is preferably one or more elements selected from the group consisting of Mn, Mg, Al, W, B, and Zr and is more preferably one or more elements selected from the group consisting of Mn, Al, and Zr.

An example of a preferable combination of x, y, z, and w described above is x of 0.02 or more and 0.3 or less, y of 0.05 or more and 0.30 or less, z of 0.02 or more and 0.35 or less, and w of 0 or more and 0.07 or less.

(Crystal Structure)

The crystal structure of CAM is layered. The crystal structure of CAM is more preferably a hexagonal crystal structure or a monoclinic crystal structure.

The hexagonal crystal structure belongs to any one space group selected from the group consisting of P3, $P3_1$, $P3_2$, R3, P-3, R-3, P312, P321, $P3_112$, $P3_121$, $P3_212$, $P3_221$, R32, P3m1, P31m, P3c1, P31c, R3m, R3c, P-31m, P-31c, P-3m1, P-3c1, R-3m, R-3c, P6, $P6_1$, $P6_5$, $P6_2$, $P6_4$, $P6_3$, P-6, P6/m, $P6_3$/m, P622, $P6_122$, $P6_522$, $P6_222$, $P6_422$, $P6_322$, P6mm, P6cc, $P6_3$cm, $P6_3$mc, P-6m2, P-6c2, P-62m, P-62c, P6/mmm, P6/mcc, $P6_3$/mcm, and $P6_3$/mmc.

In addition, the monoclinic crystal structure belongs to any one space group selected from the group consisting of P2, $P2_1$, C2, Pm, Pc, Cm, Cc, P2/m, $P2_1$/m, C2/m, P2/c, $P2_1$/c, and C2/c.

Among these, in order to obtain a lithium ion secondary battery having a high discharge capacity, the crystal structure is particularly preferably a hexagonal crystal structure belonging to the space group R-3m or a monoclinic crystal structure belonging to C2/m.

<Method for Producing Precursor>

A method for producing the precursor will be described.

The precursor is produced by a semi-continuous method (semi-batch method).

Specifically, first, the nuclei of the particles of the precursor are generated, the feeding of all raw material liquids is temporarily stopped, and then the nuclei are grown.

That is, the method is different from a method in which a nucleation step and a nuclear growth step are progressed at the same time in the same reaction vessel as in the conventional continuous crystallization method.

As the precursor, metal composite hydroxides containing Ni, Co, and Al and metal composite hydroxides containing Ni, Co, and Mn are exemplary examples.

As a metal raw material liquid in the case of producing the precursor containing Ni, Co, and Mn, a nickel salt solution, a cobalt salt solution, and a manganese salt solution are exemplary examples.

As a metal raw material liquid in the case of producing the precursor containing Ni, Co, and Al, a nickel salt solution, a cobalt salt solution, and an aluminum salt solution are exemplary examples.

Hereinafter, an example of producing a metal composite hydroxide containing Ni, Co, and Mn as the precursor will be described. The metal composite hydroxide containing Ni, Co, and Mn will be referred to as the nickel-cobalt-manganese metal composite hydroxide in some cases.

[Nucleation Step]

A metal raw material liquid mixture and a complexing agent are reacted to generate the nucleus of a metal composite hydroxide represented by $Ni_{1-x-y}Co_xMn_y(OH)_2$ ($0<x\leq 0.45$, $0<y\leq 0.45$). The metal raw material liquid mixture is a liquid mixture of a nickel salt solution, a cobalt salt solution, and a manganese salt solution.

The metal raw material liquid mixture, the complexing agent, and an alkaline aqueous solution are each continuously supplied to a reaction vessel equipped with a stirrer at the same time. This generates nuclei.

In the semi-continuous method, in order to adjust the pH value of the liquid mixture containing the metal raw material liquid mixture and the complexing agent, the alkaline aqueous solution is added to the liquid mixture before the pH of the liquid mixture turns from alkaline into neutral. As the alkaline aqueous solution, sodium hydroxide or potassium hydroxide can be used.

The value of pH in the present specification is defined as a value measured when the temperature of the liquid mixture is 40° C. The pH of the liquid mixture is measured when the temperature of the liquid mixture sampled from a reaction vessel reaches 40° C.

In a case where the temperature of the sampled liquid mixture is lower than 40° C., the pH is measured when the liquid mixture has been heated to reach 40° C.

In a case where the temperature of the sampled liquid mixture is higher than 40° C., the pH is measured when the liquid mixture has been cooled to reach 40° C.

At the time of the reaction, the temperature of the reaction vessel is controlled in a range of, for example, 20° C. or higher and 80° C. or lower and preferably 30° C. or higher and 70° C. or lower.

In addition, in the nucleation step, the pH value in the reaction vessel is controlled in a range of, for example, pH 10 or higher and pH 13 or lower and preferably pH 11 or higher and pH 13 or lower.

The substances in the reaction vessel in the nucleation step are stirred and mixed together.

As an example of the stirring rotation speed, in the following reactor example, the stirring rotation speed is preferably faster than 1500 rpm, more preferably 1600 rpm or faster, and still more preferably 1700 rpm or faster. Stirring under such stirring conditions makes it easy to uniformly mix the supplied individual raw material liquids.

Reactor Example

Liquid amount of reaction vessel: 7 L.

Blade diameter of stirring blade: 50 mm.

Position of stirring blade: 3 cm or more and 4 cm or less from the bottom of the reaction vessel.

The stirring blade provided in the reaction vessel is not limited as long as a high shearing force can be exhibited. In the present embodiment, a disk turbine blade is preferably used.

In the nucleation step, the concentration of the complexing agent in the reaction vessel is controlled to be in a range of, for example, 5.0 g/L or higher and 15.0 g/L or lower and preferably 12.0 g/L or higher and 15.0 g/L or lower.

When the concentration of the complexing agent in the reaction vessel during nucleation is set to a high concentration within the above-described range, the α, β, BET specific surface area, and tap density of the precursor to be obtained tend to decrease. In addition, the γ, δ, BET specific surface area, and tap density of CAM produced using the precursor as a raw material tend to decrease similarly.

In the nucleation process, for example, when the feeding rate of the raw material liquid to 7 L of the reaction vessel is 10 mL/min, the feeding time can be preferably adjusted to 0.5 hours or longer and 3 hours or shorter and more preferably adjusted to 1 hour or longer and 2.5 hours or shorter.

When the feeding time in the nucleation step is set within the above-described range, it is possible to adjust the amount of nuclei generated to an appropriate amount. This makes it possible to grow dense particles in the subsequent nuclear growth step.

After about 2 hours has passed from the start of the nucleation step, the feeding of all of the raw material liquids is temporarily stopped.

[Nuclear Growth Step]

After the stop of the feeding, the metal raw material liquid mixture, the complexing agent, and the alkaline aqueous solution are each continuously supplied to the same reaction vessel as the reaction vessel in which the nucleation step has been performed at the same time. This grows nuclei.

The concentration of the complexing agent in the reaction vessel in the nuclear growth step is preferably 12.0 g/L or higher and 15.0 g/L or lower.

In the nuclear growth step, the pH is controlled to be within a range of, for example, 9 or higher and 12 or lower and preferably pH 9 or higher and 11.5 or lower.

In the nuclear growth step, the substances in the reaction vessel are preferably stirred under the same stirring conditions as in the nucleation step and mixed.

As the reaction vessel, a reaction vessel in which the generated nuclei are caused to overflow for separation is used. The generated nuclei are caused to overflow from the reaction vessel and sediments and concentrates in a sedimentation vessel connected to an overflow pipe. The concentrated nuclei are refluxed to the reaction vessel, and the nuclei are again grown in the reaction vessel.

In the nucleation step and the nuclear growth step, the oxygen concentration in the reaction vessel is preferably 10% or lower. As means for adjusting the oxygen concentration to 10% or lower, aeration of an inert gas such as nitrogen into the reaction vessel is an exemplary example.

In the nucleation step and the nuclear growth step, when the substances in the reaction vessel are stirred under the above-described stirring conditions, the generation of dense nuclei and the growth of the dense nuclei are likely to progress. As a result, the structure of pores that are formed on the surface of the precursor to be produced is less likely to be disturbed. Therefore, a that is calculated by the formula (1) and β that is calculated by the formula (2) can be controlled to be within the ranges of the present embodiment.

A nickel salt, which is the solute of the nickel salt solution, is not particularly limited, and, for example, any one or more of nickel sulfate, nickel nitrate, nickel chloride, and nickel acetate can be used.

As a cobalt salt that is a solute of the cobalt salt solution, for example, any one or more of cobalt sulfate, cobalt nitrate, cobalt chloride, and cobalt acetate can be used.

As a manganese salt that is a solute of the manganese salt solution, for example, any one or more of manganese sulfate, manganese nitrate, manganese chloride, and manganese acetate can be used.

In the case of producing the precursor containing Ni, Co, and Al, as an aluminum salt that is a solute of the aluminum salt solution, for example, aluminum sulfate, sodium aluminate, or the like can be used.

The above-described metal salts are used in a proportion corresponding to the composition ratio of $Ni_{1-x-y}Co_xMn_y(OH)_2$. That is, the individual metal salts are used in amounts in which the atomic ratio among nickel in the solute of the nickel salt solution, Co in the solute of the cobalt salt solution, and Mn in the solute of the manganese salt solution corresponds to the composition ratio of $Ni_{1-x-y}Co_xMn_y(OH)_2$ and becomes 1-x-y:x:y.

In addition, the solvents of the nickel salt solution, the cobalt salt solution, and the manganese salt solution are preferably water.

The complexing agent is a compound capable of form a complex with a nickel ion, a cobalt ion, and a manganese ion in an aqueous solution. Examples of the complexing agent include an ammonium ion feeder, hydrazine, ethylenediaminetetraacetic acid, nitrilotriacetic acid, uracil diacetic acid, and glycine.

As the ammonium ion feeder, for example, ammonium salts such as ammonium hydroxide, ammonium sulfate, ammonium chloride, ammonium carbonate and ammonium fluoride can be used.

The above-described step makes it possible to obtain a slurry containing a nickel-cobalt-manganese metal composite hydroxide as the metal composite hydroxide-containing slurry.

[Dehydration Step]

After the above-described reaction, the obtained metal composite hydroxide-containing slurry is washed and then dried, and a precursor as a nickel-cobalt-manganese metal composite hydroxide is obtained.

At the time of isolating the precursor, a method in which the metal composite hydroxide-containing slurry is dehydrated by centrifugation, suction filtration, or the like is preferable.

The precursor obtained by dehydration is preferably washed with water or a washing liquid containing an alkali. In the present embodiment, the co-precipitate is preferably washed with a washing liquid containing an alkali and more preferably washed with a sodium hydroxide solution.

[Drying Step]

The precursor obtained by the dehydration step is dried in the atmospheric atmosphere under a condition of 105° C. or higher and 200° C. or lower for 1 hour or longer and 20 hours or shorter.

In the above-described example, the metal composite hydroxide is produced as the precursor, but a metal composite oxide may also be prepared. The metal composite oxide can be obtained by heating the metal composite hydroxide.

<Method for Producing CAM>

A method for producing CAM has a mixing step of mixing the precursor obtained by the method for producing the precursor and a lithium compound to obtain a mixture and a calcining step of calcining the obtained mixture.

[Mixing Step]

In the present step, the precursor and the lithium compound are mixed to obtain a mixture.

Lithium Compound

As the lithium compound, it is possible to use any one of lithium carbonate, lithium nitrate, lithium acetate, lithium hydroxide, lithium oxide, lithium chloride, and lithium fluoride or a mixture of two or more thereof. Among these, any one or both of lithium hydroxide and lithium carbonate are preferable.

The method for mixing the precursor and the lithium compound will be described.

The precursor and the lithium compound are mixed in consideration of the composition ratio of a final target product. For example, in a case where the nickel-cobalt-manganese metal composite hydroxide is used, the lithium compound and the metal composite hydroxide are used in proportions corresponding to the composition ratio of $LiNi_{1-x-y}Co_xMn_zO_2$. In addition, in the case of producing CAM excessively containing lithium (the mole ratio of Li contained is more than 1), the lithium compound and the metal composite hydroxide are mixed at proportions at which the mole ratio between Li that is contained in the lithium compound and the metal element that is contained in the metal composite hydroxide becomes a ratio of more than 1.

[Calcining Step]

CAM is obtained by calcining the mixture containing the precursor and the lithium compound.

The use of the precursor of the present embodiment as a raw material makes it possible to control the value γ that is calculated by the formula (3) and the value δ that is calculated by the formula (4) to be within the ranges of the present embodiment.

In the calcining, a dry air, an oxygen atmosphere, an inert atmosphere, or the like may be used depending on a desired composition.

The calcining step may be only one time of calcining or may have a plurality of calcining stages.

In a case where the calcining step has a plurality of calcining stages, a step in which the mixture is calcined at the highest temperature is referred to as the main calcining. Prior to the main calcining, a preliminary calcining in which the mixture is calcined at a lower temperature than in the main calcining may be performed.

The calcining temperature (highest holding temperature) in the main calcining is preferably 600° C. or higher, more preferably 700° C. or higher, and particularly preferably 800° C. or higher from the viewpoint of accelerating the growth of the CAM particles. In addition, from the viewpoint of facilitating the maintenance of the pore lengths and the like of the precursor, the calcining temperature is preferably 1200° C. or lower, more preferably 1100° C. or lower, and particularly preferably 1000° C. or lower.

The upper limit value and lower limit value of the highest holding temperature in the main calcining can be randomly combined together.

As examples of the combination, 600° C. or higher and 1200° C. or lower, 700° C. or higher and 1100° C. or lower, and 800° C. or higher and 1000° C. or lower are exemplary examples.

The calcining temperature in the preliminary calcining may be lower than the calcining temperature in the main calcining, and, for example, a range of 350° C. or higher and lower than 600° C. is an exemplary example.

The holding temperature in the calcining may be appropriately adjusted depending on the kind of a transition metal element used and the kinds and amounts of a precipitant and the inert melting agent.

After the calcining step, the mixture is appropriately crushed and sieved to obtain CAM.

<Lithium Secondary Battery>

Next, a positive electrode for a lithium secondary battery for which CAM produced by the above-described method is used as CAM of the lithium secondary battery (hereinafter, referred to as the positive electrode) and a lithium secondary battery having this positive electrode will be described while describing the configuration of the lithium secondary battery.

CAM is preferably composed of CAM of the present embodiment. CAM different from CAM of the present embodiment may be contained to an extent that the effect of the present invention is not impaired.

An example of the lithium secondary battery has a positive electrode, a negative electrode, a separator interposed between the positive electrode and the negative electrode, and an electrolyte solution disposed between the positive electrode and the negative electrode.

Figure 1B:
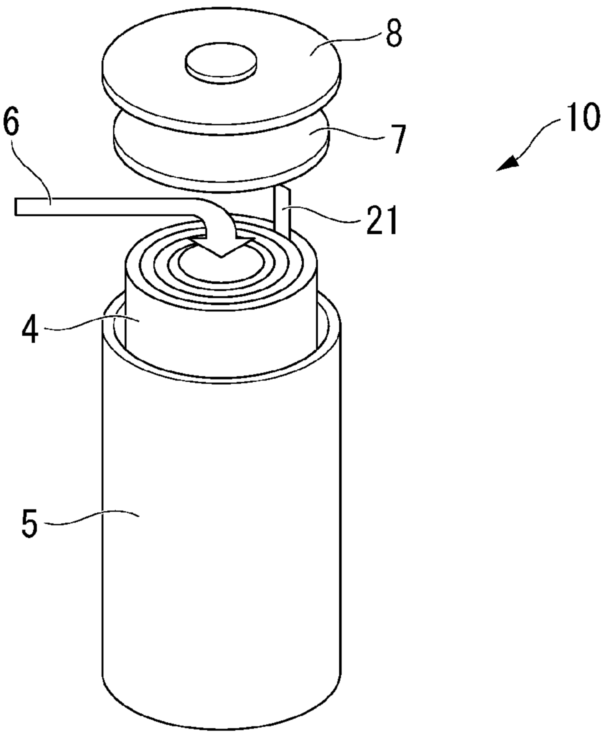
FIG. 1B is a schematic configuration view showing the example of the lithium secondary battery.

FIG. 1A and FIG. 1B are schematic views illustrating an example of the lithium secondary battery of the present embodiment. A cylindrical lithium secondary battery 10 of the present embodiment is produced as described below.

First, as shown in FIG. 1A, a pair of separators 1 having a strip shape, a strip-shaped positive electrode 2 having a positive electrode lead 21 at one end, and a strip-shaped negative electrode 3 having a negative electrode lead 31 at one end are laminated in the order of the separator 1, the positive electrode 2, the separator 1, and the negative electrode 3 and are wound to form an electrode group 4.

Next, as shown in FIG. 1B, the electrode group 4 and an insulator (not shown) are accommodated in a battery can 5, then, the can bottom is sealed, the electrode group 4 is impregnated with an electrolyte solution 6, and an electrolyte is disposed between the positive electrode 2 and the negative electrode 3. Furthermore, the upper portion of the battery can 5 is sealed with a top insulator 7 and a sealing body 8, which makes it possible to produce a lithium secondary battery 10.

As the shape of the electrode group 4, a columnar shape in which the cross-sectional shape becomes a circle, an ellipse, a rectangle, or a rectangle with rounded corners when the electrode group 4 is cut in a direction perpendicular to the winding axis is an exemplary example.

In addition, as the shape of a lithium secondary battery having such an electrode group 4, a shape that is specified by IEC60086, which is a standard for batteries specified by the International Electrotechnical Commission (IEC) or by JIS C 8500 can be adopted. Shapes such as a cylindrical shape and a square shape can be exemplary examples.

Furthermore, the lithium secondary battery is not limited to the winding-type configuration and may have a lamination-type configuration in which the laminated structure of the positive electrode, the separator, the negative electrode, and the separator is repeatedly overlaid. As the laminate-type lithium secondary battery, a so-called coin-type battery, button-type battery, or paper-type (or sheet-type) battery can be an exemplary example.

Hereinafter, each configuration will be described in order.

(Positive Electrode)

The positive electrode can be produced by, first, preparing a positive electrode mixture containing CAM, a conductive material, and a binder and supporting the positive electrode mixture by a positive electrode current collector.

(Conductive Material)

As the conductive material in the positive electrode, a carbon material can be used. As the carbon material, graphite powder, carbon black (for example, acetylene black), a fibrous carbon material, and the like can be exemplary examples.

The proportion of the conductive material in the positive electrode mixture is preferably 5 parts by mass or more and 20 parts by mass or less with respect to 100 parts by mass of CAM.

(Binder)

As the binder in the positive electrode, a thermoplastic resin can be used. As the thermoplastic resin, polyimide resins, fluororesins such as polyvinylidene fluoride (hereinafter, referred to as PVdF in some cases) and polytetrafluoroethylene, polyolefin resins such as polyethylene and polypropylene; and the resins described in WO 2019/098384A1 or US2020/0274158A1 can be exemplary examples.

(Positive Electrode Current Collector)

As the positive electrode current collector in the positive electrode, a strip-shaped member formed of a metal material such as Al, Ni, or stainless steel as a forming material can be used.

As a method for supporting the positive electrode mixture by the positive electrode current collector, a method in which a paste of the positive electrode mixture is prepared using an organic solvent, the paste of the positive electrode mixture to be obtained is applied to and dried on at least one surface side of the positive electrode current collector, and the positive electrode mixture is fixed by pressing is an exemplary example.

As the organic solvent that can be used in a case where the paste of the positive electrode mixture is prepared, an amide-based solvent such as N-methyl-2-pyrrolidone (hereinafter, referred to as NMP in some cases) is an exemplary example.

As the method for applying the paste of the positive electrode mixture to the positive electrode current collector, a slit die coating method, a screen coating method, a curtain coating method, a knife coating method, a gravure coating method, and an electrostatic spraying method are exemplary examples.

The positive electrode can be produced by the method exemplified above.

(Negative Electrode)

The negative electrode in the lithium secondary battery needs to be a material which can be doped with lithium ions and from which lithium ions can be de-doped at a potential lower than that of the positive electrode, and an electrode in which a negative electrode mixture containing a negative electrode active material is supported by a negative electrode current collector and an electrode formed of a negative electrode active material alone are exemplary examples.

(Negative Electrode Active Material)

As the negative electrode active material in the negative electrode, materials which are a carbon material, a chalcogen compound (oxide, sulfide, or the like), a nitride, a metal, or an alloy and can be doped with lithium ions and from which lithium ions can be de-doped at a lower potential than the positive electrode are exemplary examples.

As the carbon material that can be used as the negative electrode active material, graphite such as natural graphite and artificial graphite, cokes, carbon black, pyrolytic carbons, carbon fibers, and calcined products of an organic polymer compound are exemplary examples.

As oxides that can be used as the negative electrode active material, oxides of silicon represented by a formula $SiO_x$ (here, x is a positive real number) such as $SiO_2$ and SiO oxides of tin represented by a formula $SnO_x$ (here, x is a positive real number) such as $SnO_2$ and SnO; and metal composite oxides containing lithium and titanium such as $Li_4Ti_5O_{12}$ and $LiVO_2$ can be exemplary examples.

In addition, as the metal that can be used as the negative electrode active material, lithium metal, silicon metal, tin metal, and the like can be exemplary examples.

As a material that can be used as the negative electrode active material, the materials described in WO 2019/098384A1 or US2020/0274158A1 may be used.

These metals and alloys can be used as an electrode, mainly, singly after being processed into, for example, a foil shape.

Among the above-described negative electrode active materials, the carbon material containing graphite such as natural graphite or artificial graphite as a main component is preferably used for the reason that the potential of the negative electrode rarely changes (the potential flatness is favorable) from a uncharged state to a fully-charged state during charging, the average discharging potential is low, the capacity retention rate at the time of repeatedly charging and discharging the lithium secondary battery is high (the cycle characteristics are favorable), and the like. The shape of the carbon material may be, for example, any of a flaky shape such as natural graphite, a spherical shape such as mesocarbon microbeads, a fibrous shape such as a graphitized carbon fiber, or an aggregate of fine powder.

The negative electrode mixture may contain a binder as necessary. As the binder, thermoplastic resins can be exemplary examples, and specifically, PVdF, thermoplastic polyimide, carboxymethylcellulose (hereinafter, referred to as CMC in some cases), styrene-butadiene rubber (hereinafter, referred to as SBR in some cases), polyethylene, and polypropylene can be exemplary examples.

(Negative Electrode Current Collector)

As the negative electrode current collector in the negative electrode, a strip-shaped member formed of a metal material such as Cu, Ni, or stainless steel as the forming material can be an exemplary example.

As the method for supporting the negative electrode mixture by the negative electrode current collector, similarly to the case of the positive electrode, a method in which the negative electrode mixture is formed by pressurization and a method in which a paste of the negative electrode mixture is prepared using a solvent or the like, applied and dried on the negative electrode current collector, and then the negative electrode mixture is compressed by pressing are exemplary examples.

(Separator)

As the separator in the lithium secondary battery, it is possible to use, for example, a material that is made of a material such as a polyolefin resin such as polyethylene or polypropylene, a fluororesin, or a nitrogen-containing aromatic polymer and has a form such as a porous film, a non-woven fabric, or a woven fabric. In addition, the separator may be formed using two or more of these materials or the separator may be formed by laminating these materials.

In addition, the separators described in JP-A-2000-030686 or US20090111025A1 may be used.

(Electrolyte Solution)

The electrolyte solution in the lithium secondary battery contains an electrolyte and an organic solvent.

As the electrolyte that is contained in the electrolyte solution, lithium salts such as $LiClO_4$, $LiPF_6$, and $LiBF_4$ are exemplary examples, and a mixture of two or more thereof may be used. In addition, the electrolytes described in WO 2019/098384A1 or US2020/0274158A1 may be used. Among these, as the electrolyte, at least one selected from the group consisting of $LiPF_6$, $LiAsF_6$, $LiSbF_6$, $LiBF_4$, $LiCF_3SO_3$, $LiN(SO_2CF_3)_2$, and $LiC(SO_2CF_3)_3$, which contain fluorine, is preferably used.

As the organic solvent that is contained in the electrolyte solution, for example, propylene carbonate, ethylene carbonate, dimethyl carbonate, diethyl carbonate, ethyl methyl carbonate, and the organic solvents described in WO 2019/098384A1 or US2020/0274158A1 can be used.

As the organic solvent, two or more of these are preferably mixed and used, and a solvent mixture of a cyclic carbonate and a non-cyclic carbonate and a solvent mixture of a cyclic carbonate and ethers are more preferable. As the solvent mixture of a cyclic carbonate and a non-cyclic carbonate, a solvent mixture containing ethylene carbonate, dimethyl carbonate, and ethyl methyl carbonate is preferable.

In addition, as the electrolyte solution, it is preferable to use an electrolyte solution containing a lithium salt containing fluorine such as $LiPF_6$ and an organic solvent having a fluorine substituent since the safety of lithium secondary batteries to be obtained is enhanced.

Since CAM having the above-described configuration is produced using the above-described precursor, lithium secondary batteries having a high discharge capacity and being less likely to deteriorate during high-temperature storage can be produced.

In addition, since the positive electrode having the above-described configuration has CAM having the above-described configuration, lithium secondary batteries having a high discharge capacity and being less likely to deteriorate during high-temperature storage can be produced.

<All-Solid-State Lithium Secondary Battery>

Next, a positive electrode for which CAM that is produced using the precursor is used as CAM for an all-solid-state lithium secondary battery and an all-solid-state lithium secondary battery having this positive electrode will be described while describing the configuration of the all-solid-state lithium secondary battery.

Figure 2:
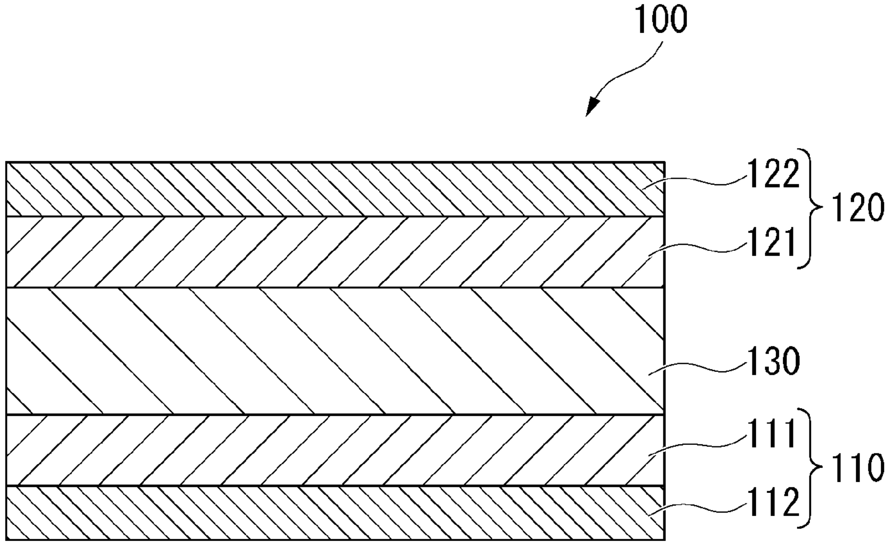
FIG. 2 is a schematic view showing a laminate that an all-solid-state lithium secondary battery includes.
Figure 3:
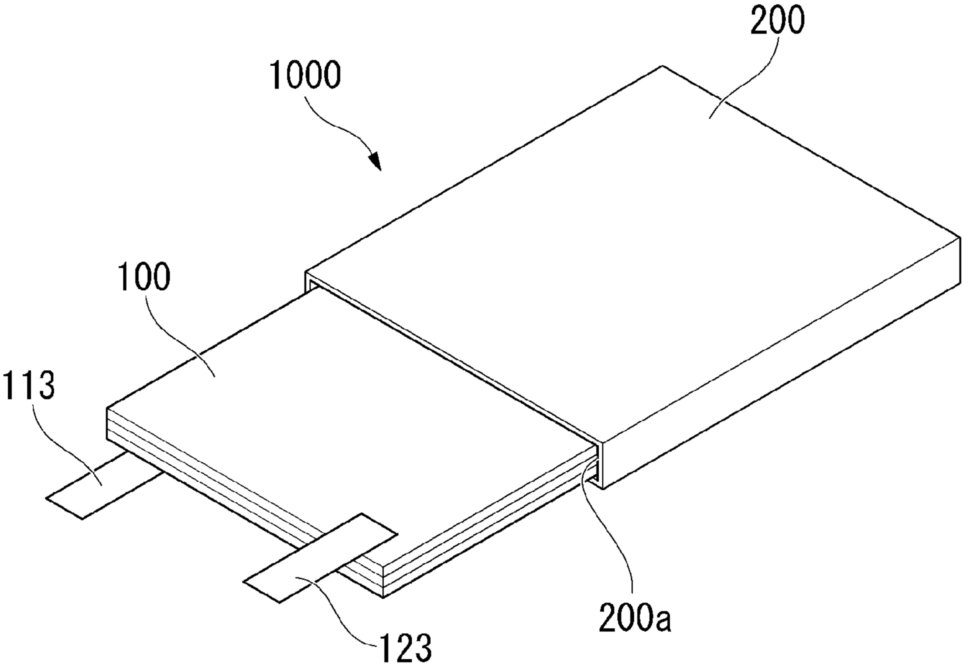
FIG. 3 is a schematic view showing an entire configuration of the all-solid-state lithium secondary battery.

FIG. 2 and FIG. 3 are schematic views showing an example of the all-solid-state lithium secondary battery. FIG. 2 is a schematic view showing a laminate that an all-solid-state lithium secondary battery includes. FIG. 3 is a schematic view showing an entire configuration of the all-solid-state lithium secondary battery.

An all-solid-state lithium secondary battery 1000 has a laminate 100 having a positive electrode 110, a negative electrode 120, and a solid electrolyte layer 130 and an exterior body 200 accommodating the laminate 100. In addition, the all-solid-state lithium secondary battery 1000 may have a bipolar structure in which a CAM and a negative electrode active material are disposed on both sides of a current collector. As specific examples of the bipolar structure, for example, the structures described in JP-A-2004-95400 are exemplary examples.

A material that configures each member will be described below.

The laminate 100 may have an external terminal 113 that is connected to a positive electrode current collector 112 and an external terminal 123 that is connected to a negative electrode current collector 122.

In the laminate 100, the positive electrode 110 and the negative electrode 120 interpose the solid electrolyte layer 130 so as not to short-circuit each other. In addition, the all-solid-state lithium secondary battery 1000 may have a separator, which has been used in conventional liquid-based lithium ion secondary batteries, between the positive electrode 110 and the negative electrode 120 to prevent a short circuit between the positive electrode 110 and the negative electrode 120.

The all-solid-state lithium secondary battery 1000 has an insulator, not shown, that insulates the laminate 100 and the exterior body 200 from each other or a sealant, not shown, that seals an opening portion 200*a* of the exterior body 200.

As the exterior body 200, a container formed of a highly corrosion-resistant metal material such as aluminum, stainless steel or nickel-plated steel can be used. In addition, a container obtained by processing a laminate film having at least one surface on which a corrosion resistant process has been performed into a bag shape can also be used.

As the shape of the all-solid-state lithium secondary battery 1000, for example, shapes such as a coin type, a button type, a paper type (or a sheet type), a cylindrical type, and a square type can be exemplary examples.

The all-solid-state lithium secondary battery 1000 is shown in the drawings to have one laminate 100, but is not limited thereto. The all-solid-state lithium-ion secondary battery 1000 may have a configuration in which the laminate 100 is used as a unit cell and a plurality of unit cells (laminates 100) is sealed inside the exterior body 200.

Hereinafter, each configuration will be described in order.

(Positive Electrode)

The positive electrode 110 has a positive electrode active material layer 111 and a positive electrode current collector 112.

The positive electrode active material layer 111 contains CAM, which is one aspect of the present invention described above, and a solid electrolyte. In addition, the positive electrode active material layer 111 may contain a conductive material and a binder.

(Solid Electrolyte)

As the solid electrolyte that is contained in the positive electrode active material layer 111, a solid electrolyte that has lithium ion conductivity and used in well-known all-solid-state batteries can be adopted. As the solid electrolyte, an inorganic electrolyte and an organic electrolyte can be exemplary examples. As the inorganic electrolyte, an oxide-based solid electrolyte, a sulfide-based solid electrolyte, and a hydride-based solid electrolyte can be exemplary examples. As the organic electrolyte, polymer-based solid electrolytes are exemplary examples. As each electrolyte, the compounds described in WO 2020/208872A1, US2016/0233510A1, US2012/0251871A1, and US2018/0159169A1 are exemplary examples, and examples thereof include the following compounds.

(Oxide-Based Solid Electrolyte)

As the oxide-based solid electrolyte, for example, a perovskite-type oxides, a NASICON-type oxide, a LISICON-type oxide, a garnet-type oxides, and the like are exemplary examples. Specific examples of each oxide include the compounds described in WO 2020/208872A1, US2016/0233510A1, and US2020/0259213A1.

As the garnet-type oxide, Li—La—Zr-based oxides such as $Li_7La_3Zr_2O_{12}$ (also referred to as LLZ) are exemplary examples.

The oxide-based solid electrolyte may be a crystalline material or an amorphous material.

(Sulfide-Based Solid Electrolyte)

As the sulfide-based solid electrolyte, $Li_2S$—$P_2S_5$-based compounds, $Li_2S$—$SiS_2$-based compounds, $Li_2S$—$GeS_2$-based compounds, $Li_2S$—$B_2S_3$-based compounds, LiI—$Si_2S$—$P_2S_5$-based compounds, LiI—$Li_2S$—$P_2O_5$-based compounds, LiI—$LiPO_4$—$P_2S_5$-based compounds, $Li_{10}GeP_2S_{12}$, and the like can be exemplary examples.

In the present specification, the expression "-based compound" that indicates the sulfide-based solid electrolyte is used as a general term for solid electrolytes mainly containing a raw material written before "-based compound" such as "$Li_2S$" or "$P_2S_5$". For example, the $Li_2S$—$P_2S_5$-based compounds include solid electrolytes mainly containing $Li_2S$ and $P_2S_5$ and further containing a different raw material. The proportion of $Li_2S$ that is contained in the $Li_2S$—$P_2S_5$-based compound is, for example, 50 to 90 mass % with respect to the entire $Li_2S$—$P_2S_5$-based compound. The proportion of $P_2S_5$ that is contained in the $Li_2S$—$P_2S_5$-based compound is, for example, 10 to 50 mass % with respect to the entire $Li_2S$—$P_2S_5$-based compound. In addition, the proportion of the different raw material that is contained in the $Li_2S$—$P_2S_5$-based compound is, for example, 0 to 30 mass % with respect to the entire $Li_2S$—$P_2S_5$-based compound. In addition, the $Li_2S$—$P_2S_5$-based compounds also include solid electrolytes containing $Li_2S$ and $P_2S_5$ in different mixing ratios.

As the $Li_2S$—$P_2S_5$-based compounds, $Li_2S$—$P_2S_5$, $Li_2S$—$P_2S_5$—LiI, $Li_2S$—$P_2S_5$—LiCl, $Li_2S$—$P_2S_5$—LiBr, $Li_2S$—$P_2S_5$—LiI—LiBr, and the like can be exemplary examples.

As the $Li_2S$—$SiS_2$-based compounds, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$SiS_2$—$P_2S_5$—LiCl, and the like are exemplary examples.

As the $Li_2S$—$GeS_2$-based compounds, $Li_2S$—$GeS_2$, $Li_2S$—$GeS_2$—$P_2S_5$, and the like are exemplary examples.

The sulfide-based solid electrolyte may be a crystalline material or an amorphous material.

Two or more solid electrolytes can be jointly used as long as the effect of the invention is not impaired.

(Conductive Material and Binder)

As the conductive material that the positive electrode active material layer 111 may have, the materials described in the above-described (conductive material) can be used. In addition, as for the proportion of the conductive material in the positive electrode mixture, the proportions described in the above-described (conductive material) can be applied in the same manner. In addition, as the binder that the positive electrode has, the materials described in the above-described (binder) can be used.

(Positive Electrode Current Collector)

As the positive electrode current collector 112 that the positive electrode 110 has, the materials described in the above-described (positive electrode current collector) can be used.

As a method for supporting the positive electrode active material layer 111 by the positive electrode current collector 112, a method in which the positive electrode active material layer 111 is formed by pressurization on the positive electrode current collector 112 is an exemplary example. A cold press or a hot press can be used for the pressurization.

In addition, the positive electrode active material layer 111 may be supported by the positive electrode current collector 112 by preparing a paste of a mixture of CAM, the solid electrolyte, the conductive material, and the binder using an organic solvent to produce a positive electrode mixture, applying and drying the positive electrode mixture to be obtained on at least one surface of the positive electrode current collector 112, and fixing the positive electrode mixture by pressing.

In addition, the positive electrode active material layer 111 may be supported by the positive electrode current collector 112 by preparing a paste of a mixture of the CAM, the solid electrolyte, and the conductive material using an organic solvent to produce a positive electrode mixture, applying and drying the positive electrode mixture to be obtained on at least one surface of the positive electrode current collector 112, and sintering the positive electrode mixture.

As the organic solvent that can be used for the positive electrode mixture, the same organic solvent as the organic solvent that can be used in the case of preparing the paste of the positive electrode mixture described in the above-described (positive electrode current collector) can be used.

As a method of applying the positive electrode mixture to the positive electrode current collector 112, the methods described in the above-described section (positive electrode current collector) are exemplary example.

The positive electrode 110 can be produced by the method exemplified above.

(Negative Electrode)

The negative electrode 120 has a negative electrode active material layer 121 and the negative electrode current collector 122. The negative electrode active material layer 121 contains a negative electrode active material. In addition, the negative electrode active material layer 121 may contain a solid electrolyte and a conductive material. As the negative electrode active material, the negative electrode current collector, the solid electrolyte, the conductive material, and a binder, those described above can be used.

(Solid Electrolyte Layer)

The solid electrolyte layer 130 has the above-described solid electrolyte.

The solid electrolyte layer 130 can be formed by depositing a solid electrolyte of an inorganic substance on the surface of the positive electrode active material layer 111 in the above-described positive electrode 110 by a sputtering method.

In addition, the solid electrolyte layer 130 can be formed by applying and drying a paste-form mixture containing a solid electrolyte on the surface of the positive electrode active material layer 111 in the above-described positive electrode 110. The solid electrolyte layer 130 may be formed by pressing the dried paste-form mixture and further pressurizing the paste-form mixture by a cold isostatic pressure method (CIP).

Since the lithium secondary battery having the above-described configuration has CAM having the above-described configuration, lithium secondary batteries having a high discharge capacity and being less likely to deteriorate during high-temperature storage can be produced.

EXAMPLES

Next, the present invention will be described in more detail using examples.

<Composition Analysis>

The composition analyses of a precursor and CAM that were to be produced by a method to be described below were each performed by the method described in the above-described section [Composition analyses of precursor and CAM].

<<Formula (1)>>

For the precursor produced by the method to be described below, the value α that is calculated by the following formula (1) was calculated.

$$\alpha = A^2/(4\pi V)/1000 \quad (1)$$

In the formula (1), A and V were calculated by the method described in the above-described section [Method for measuring A and V].

<<Formula (2)>>

For the precursor produced by the method to be described below, the value β that is calculated by the following formula (2) was calculated.

$$\beta = B^2/(4\pi X)/1000 \quad (2)$$

In the formula (2), B and X were calculated by the method described in the above-described section [Method for measuring B and X].

<<Formula (3)>>

For CAM produced by the method to be described below, the value γ was calculated by the following formula (3).

$$\gamma = C^2/(4\pi Y) \quad (3)$$

In the formula (3), C and Y were calculated by the method described in the above-described section [Method for measuring C and Y].

<<Formula (4)>>

For CAM produced by the method to be described below, the value δ that is calculated by the following formula (4) was calculated.

$$\delta = E^2/(4\pi Z) \quad (4)$$

In the formula (4), E and Z were calculated by the method described in the above-described section [Method for measuring E and Z].

<Measurement of BET Specific Surface Area>

The BET specific surface area of the precursor or CAM was measured by the method described in the above-described section [Measurement of BET specific surface area of precursor and CAM].

<Measurement of Tap Density>

The tap density of the precursor or CAM was measured by the method described in the above-described section [Measurement of tap density of precursor and CAM].

<Production of Positive Electrode>

A paste-like positive electrode mixture was prepared by adding and kneading the CAM, a conductive material (acetylene black), and a binder (PVdF) in proportions at which the composition of CAM:conductive material:binder=92:5:3 (mass ratio) was reached. During the preparation of the positive electrode mixture, N-methyl-2-pyrrolidone was used as an organic solvent.

The obtained positive electrode mixture was applied to an Al foil having a thickness of 40 μm, which was to serve as a current collector, and dried in a vacuum at 150° C. for 8 hours, thereby obtaining a positive electrode. The electrode area of this positive electrode was set to 1.65 $cm^2$.

<Production of Negative Electrode>

Next, a paste-like negative electrode mixture was prepared by adding and kneading artificial graphite (MAGD manufactured by Hitachi Chemical Co., Ltd.) as a negative electrode active material, CMC (manufactured by DKS Co.

Ltd.) and SBR (manufactured by Nippon A & L Inc.) as binders in proportions at which a composition of negative electrode active material:CMC:SBR=98:1:1 (mass ratio) was achieved. At the time of preparing the negative electrode mixture, ion exchange water was used as a solvent.

The obtained negative electrode mixture was applied to a Cu foil having a thickness of 12 μm, which was to serve as a current collector, and dried in a vacuum at 60° C. for 8 hours, thereby obtaining a negative electrode. The electrode area of this negative electrode was set to 1.77 $cm^2$.

<Production of Lithium Secondary Battery>

The positive electrode produced in the section <Production of positive electrode> section was placed on an aluminum laminate film with the aluminum foil surface facing downward, and a laminated film separator (polyethylene porous film (thickness: 27 μm)) was placed thereon. Next, the negative electrode produced in the section <Production of negative electrode> section was placed on the upper side of the laminated film separator with the copper foil surface facing upward, and an aluminum laminate film was placed thereon. Furthermore, the laminate was heat-sealed except a portion for injecting an electrolyte solution. After that, the laminate was transferred into a dry bench in a dry atmosphere at the dew point temperature −50° C. or lower, and 1 mL of the electrolyte solution was injected using a vacuum injector. As the electrolyte solution, an electrolyte solution obtained by adding 1 vol % of vinylene carbonate to a liquid mixture of ethylene carbonate, dimethyl carbonate, and ethyl methyl carbonate in a volume ratio of 16:10:74 and dissolving $LiPF_6$ in the mixture at a proportion of 1.3 mol/l.

Finally, the electrolyte solution injection portion was heat-sealed to produce a laminate cell.

<High-Temperature Storage Test>

A high-temperature storage test was performed using the laminate cell obtained in the section <Preparation of lithium secondary battery> according to the method described in the above-described section [High-temperature storage test], the discharge capacity before storage and the discharge capacity after storage were measured, and the storage capacity retention rate was obtained from these values.

Example 1

[Nucleation Step]

Using a device having the inside of a reaction vessel equipped with a stirrer and an overflow pipe, a condensation tank connected to the overflow pipe, and a mechanism for performing circulation from the condensation tank to the reaction vessel, water was put into the reaction vessel, then, an aqueous solution of sodium hydroxide was added, and the liquid temperature was held at 50° C.

A nickel sulfate aqueous solution, a cobalt sulfate aqueous solution, and a manganese sulfate aqueous solution were mixed together in proportions at which the atomic ratio among Ni, Co, and Mn reached 0.58:0.20:0.22, thereby preparing a metal raw material liquid mixture.

Next, 46.6 g of ammonium sulfate crystals as a complexing agent were injected into a reaction vessel with respect to the capacity 1 L of the reaction vessel, and the concentration of the complexing agent in the reaction vessel was adjusted to 12 g/L. Under stirring, a metal raw material liquid mixture and an ammonium sulfate aqueous solution as a complexing agent were continuously added at feeding rates of 10 mL/min and 0.5 mL/min.

A disk turbine blade having a blade diameter of 50 mm was installed as a stirring blade at a position of 4 cm from the bottom of the reaction vessel with respect to 7 L of the solution in the reaction vessel, and a sodium hydroxide aqueous solution was timely added dropwise while being stirred at a stirring rate of 1800 rpm such that the pH of the solution in the reaction vessel reached 11.7 (measurement temperature: 40° C.).

After 2 hours had elapsed from the start of the nucleation step, the feeding of all liquids was stopped.

[Nuclear Growth Step]

Subsequently, the metal raw material liquid mixture and the ammonium sulfate aqueous solution were continuously added to the reaction vessel in which the nucleation step had been performed at feeding rates of 8 mL/min and 1.2 mL/min. A sodium hydroxide aqueous solution was timely added dropwise such that the pH of the solution in the reaction vessel reached 11.0 (measurement temperature: 40° C.). After 15.5 hours had elapsed from the start of the nuclear growth step, the feeding of all liquids was stopped, and the crystallization reaction was ended.

The obtained nickel-cobalt-manganese metal composite hydroxide-containing slurry was washed, dehydrated, then, dried at 105° C. for 20 hours, and sieved, thereby obtaining a precursor that was a nickel-cobalt-manganese metal composite hydroxide. A variety of measurements and a composition analysis were performed on the obtained precursor. These results are shown in Table 1.

Example 2

A precursor that was a nickel-cobalt-manganese metal composite hydroxide was produced in the same manner as in Example 1 except that the concentration of the complexing agent in the reaction vessel in the nucleation step was changed to 5 g/L and the pH in the reaction vessel in the nucleation step was changed to 12.3 (measurement temperature: 40° C.).

Example 3

A precursor that was a nickel-cobalt-aluminum metal composite hydroxide was produced in the same manner as in Example 1 except that the metal raw material liquid mixture was supplied in proportions of Ni:Co:Al=88:9:3, the concentration of the complexing agent in the reaction vessel in the nucleation step was changed to 9 g/L, and the pH in the reaction vessel in the nucleation step was set to 12.0 (measurement temperature: 40° C.).

Comparative Example 1

A precursor that was a nickel-cobalt-manganese metal composite hydroxide was produced in the same manner as in Example 1 except that the stirring blade of the blade-type stirrer was changed to an inclined paddle blade having a blade diameter of 50 mm, the stirring rate was changed to 1500 rpm, the concentration of the complexing agent in the reaction vessel in the nucleation step was changed to 5 g/L, the pH in the reaction vessel in the nucleation step was set to 12.8 (measurement temperature: 40° C.), and the feeding time in the nucleation step was set to 4 hours.

Comparative Example 2

A precursor that was a nickel-cobalt-manganese metal composite hydroxide was produced in the same manner as in Example 1 except that the stirring blade of the blade-type stirrer was changed to an inclined paddle blade having a blade diameter of 50 mm, the stirring rate was changed to 1500 rpm, the concentration of the complexing agent in the reaction vessel in the nucleation step was changed to 1 g/L, and the pH in the reaction vessel in the nucleation step was set to 12.8 (measurement temperature: 40° C.).

Table 1 below shows the compositions, the stirring rates, the complexing agent concentrations, the α, A, V, β, B, and X, the cumulative pore volumes ($cm^3/g$) and cumulative pore specific surface areas ($m^2/g$) for which the pore diameters were 10 nm or more and 200 nm or less, the BET specific surface areas, and the tap densities in Examples 1 to 3 and Comparative Examples 1 and 2. In Table 1, "N/C/M/A" means "Ni/Co/Mn/Al".

TABLE 1

| | | | Example 1 | Example 2 | Example 3 | Comparative Example 1 | Comparative Example 2 |
|---|---|---|---|---|---|---|---|
| Composition N/C/M/A | | | 58/20/22/0 | 58/20/22/0 | 88/9/0/3 | 58/20/22/0 | 58/20/22/0 |
| Conditions of production method | Stirring rate | rpm | 1800 | 1800 | 1800 | 1500 | 1500 |
| | Complexing agent concentration | g/L | 12 | 5 | 9 | 5 | 1 |
| Physical properties | α | m/ng | 0.64 | 0.78 | 1.7 | 2.4 | 4.3 |
| | A | $m^2/g$ | 15 | 29 | 39 | 61 | 127 |
| | V | $cm^3/g$ | 0.029 | 0.087 | 0.072 | 0.12 | 0.30 |
| | β | m/ng | 0.83 | 1.2 | 2.1 | 3.0 | 5.4 |
| | B | $m^2/g$ | 15 | 28 | 38 | 59 | 124 |
| | X | $cm^3/g$ | 0.021 | 0.049 | 0.055 | 0.092 | 0.23 |
| | Cumulative pore volume of 10 to 200 nm | $cm^3/g$ | 0.021 | 0.069 | 0.047 | 0.089 | 0.23 |
| | Cumulative pore specific surface area of 10 to 200 mm | $m^2/g$ | 2.1 | 6.4 | 6.7 | 11 | 31 |
| | BET specific surface area | $m^2/g$ | 5.5 | 20 | 20 | 27 | 54 |
| | Tap density | $g/cm^3$ | 1.8 | 1.0 | 1.2 | 0.72 | 0.59 |

Example 4

The precursor of Example 1 and a lithium hydroxide powder were weighed in proportions where the mole ratio of Li in the lithium hydroxide powder to Ni, Co, and Mn in the precursor reached Li/(Ni+Co+Mn)=1.03 and mixed to obtain a mixture.

After that, the obtained mixture was calcined at 650° C. for 5 hours in an oxygen atmosphere, crushed with a millstone-type crusher, and further calcined at 840° C. for 5 hours in the oxygen atmosphere. The mixture was crushed again with the millstone-type crusher, thereby obtaining CAM. As a result of performing the composition analysis and comparing the composition with the composition formula (I), a was 0.06, x was 0.19, y was 0.21, and M was Mn.

Example 5

CAM was obtained in the same manner as in Example 4 except that the precursor of Example 2 was used. As a result of performing the composition analysis and comparing the composition with the composition formula (I), a was 0.05, x was 0.20, y was 0.22, and M was Mn.

Example 6

CAM was obtained in the same manner as in Example 4 except that the precursor of Example 3 and the lithium hydroxide powder were weighed in proportions where the mole ratio of Li in the lithium hydroxide powder to Ni, Co, and Al in the precursor reached Li/(Ni+Co+Al)=1.03 and mixed and the second calcining temperature was set to 770° C. As a result of performing the composition analysis and comparing the composition with the composition formula (I), a was 0.06, x was 0.09, y was 0.03, and M was Al.

Comparative Example 3

CAM was obtained in the same manner as in Example 4 except that the precursor of Comparative Example 1 was used and the second calcining temperature was set to 1000° C. As a result of performing the composition analysis and comparing the composition with the composition formula (I), a was 0.06, x was 0.20, y was 0.22, and M was Mn.

Comparative Example 4

CAM was obtained in the same manner as in Example 4 except that the precursor of Comparative Example 2 was used. As a result of performing the composition analysis and comparing the composition with the composition formula (I), a was 0.06, x was 0.20, y was 0.22, and M was Mn.

γ, C, Y, δ, E, Z, the cumulative pore volumes ($cm^3/g$) and cumulative pore specific surface areas ($m^2/g$) for which the pore diameters were 10 nm or more and 200 nm or less, the BET specific surface areas, the tap densities, the discharge capacities before storage, the discharge capacities after storage, and the storage capacity retention rates of CAMs in Examples 4 to 6 and Comparative Examples 3 and 4 are shown in Table 2.

TABLE 2

| | | | Example 4 | Example 5 | Example 6 | Comparative Example 3 | Comparative Example 4 |
|---|---|---|---|---|---|---|---|
| Physical properties | γ | m/ug | 6.9 | 23.0 | 14 | 3.6 | 45.0 |
| | C | $m^2/g$ | 0.74 | 2.8 | 1.4 | 0.26 | 5.9 |
| | Y | $cm^3/g$ | 0.0064 | 0.028 | 0.012 | 0.0014 | 0.062 |
| | δ | m/ug | 12.0 | 43.0 | 17.0 | 6.3 | 98 |
| | E | $m^2/g$ | 0.58 | 2.0 | 1.2 | 0.22 | 3.8 |
| | Z | $cm^3/g$ | 0.0022 | 0.0074 | 0.0074 | 0.00064 | 0.012 |
| | Cumulative pore volume of 10 to 200 nm | $cm^3/g$ | 0.006 | 0.026 | 0.011 | 0.0013 | 0.056 |
| | Cumulative pore specific surface area of 10 to 200 nm | $m^2/g$ | 0.34 | 1.4 | 0.76 | 0.11 | 2.9 |
| | BET specific surface area | $m^2/g$ | 0.7 | 2.7 | 1.3 | 0.2 | 5.0 |
| | Tap density | $g/cm^3$ | 2.2 | 1.4 | 1.7 | 2.9 | 0.8 |
| Evaluation | Discharge capacity before storage | mAh/g | 187 | 187 | 207 | 168 | 187 |
| | Discharge capacity after storage | mAh/g | 169 | 160 | 185 | 160 | 147 |
| | Storage capacity retention rate | % | 90 | 86 | 89 | 95 | 78 |

As shown by the above-described results, it was possible to confirm that, for the lithium secondary batteries for which CAM produced using the precursor of the present embodiment was used, the discharge capacities before storage were 180 mAh/g or more, the storage capacity retention rates under high-temperature conditions were 85% or more, the discharge capacities were high, and the batteries did not easily deteriorate during high-temperature storage.

REFERENCE SIGNS LIST

1: Separator
2: Positive electrode
3: Negative electrode
4: Electrode group
5: Battery can
6: Electrolyte solution
7: Top insulator
8: Sealing body
10: Lithium secondary battery
21: Positive electrode lead
31: Negative electrode lead
100: Laminate
110: Positive electrode
111: Positive electrode active material layer
112: Positive electrode current collector
113: External terminal
120: Negative electrode
121: Negative electrode solid electrolyte layer
122: Negative electrode current collector
123: External terminal
130: Solid electrolyte layer
200: Exterior body
**200*a***: Opening portion
1000: All-solid-state lithium secondary battery

What is claimed is:

1. A precursor of a positive electrode active material for a lithium secondary battery, comprising at least Ni, wherein a value α that is calculated by a formula (1) is 2.3 m/ng or less, $$\alpha=A^2/(4\pi V)/1000 \quad (1)$$

in the formula (1), A is a cumulative pore specific surface area ($m^2/g$) for which pore diameters are 2.6 nm or more and 200 nm or less among pore specific surface areas that are obtained by analyzing a nitrogen desorption isotherm of the precursor measured at a liquid nitrogen temperature by a BJH method, and V is a cumulative pore volume ($cm^3/g$) for which pore diameters are 2.6 nm or more and 200 nm or less among pore volumes that are obtained by analyzing the nitrogen desorption isotherm of the precursor measured at the liquid nitrogen temperature by the BJH method.

2. The precursor according to claim 1, wherein a value β that is calculated by a formula (2) is 2.8 m/ng or less, $$\beta=B^2/(4\pi X)/1000 \quad (2)$$

in the formula (2), B is a cumulative pore specific surface area ($m^2/g$) for which pore diameters are 2.6 nm or more and 50 nm or less among the pore specific surface areas that are obtained by analyzing the nitrogen desorption isotherm of the precursor measured at the liquid nitrogen temperature by the BJH method, and X is a cumulative pore volume ($cm^3/g$) for which pore diameters are 2.6 nm or more and 50 nm or less among the pore volumes that are obtained by analyzing the nitrogen desorption isotherm of the precursor measured at the liquid nitrogen temperature by the BJH method.

3. The precursor according to claim 1, wherein a BET specific surface area is 1.0 $m^2/g$ or more and 25 $m^2/g$ or less.

4. The precursor according to claim 1, wherein a tap density is 0.8 $g/cm^3$ or more and 2.7 $g/cm^3$ or less.

5. A positive electrode active material for a lithium secondary battery, comprising at least Ni, wherein a value γ that is calculated by a formula (3) is 4.0 m/μg or more and 40.0 m/μg or less, $$\gamma=C^2/(4\pi Y) \quad (3)$$

in the formula (3), C is a cumulative pore specific surface area ($m^2/g$) for which pore diameters are 2.6 nm or more and 200 nm or less among pore specific surface areas that are obtained by analyzing a nitrogen desorption isotherm of the positive electrode active material for the lithium secondary battery measured at a liquid nitrogen temperature by a BJH method, and Y is a cumulative pore volume ($cm^3/g$) for which pore diameters are 2.6 nm or more and 200 nm or less among pore volumes that are obtained by analyzing the nitrogen desorption isotherm of the positive electrode active material for the lithium secondary battery measured at the liquid nitrogen temperature by the BJH method.

6. The positive electrode active material for the lithium secondary battery according to claim 5, wherein a value δ that is calculated by a formula (4) is 10 m/μg or more and 50 m/μg or less, $$\delta = E^2/(4\pi Z) \quad (4)$$

in the formula (4), E is a cumulative pore specific surface area ($m^2/g$) for which pore diameters are 2.6 nm or more and 50 nm or less among the pore specific surface areas that are obtained by analyzing the nitrogen desorption isotherm of the positive electrode active material for the lithium secondary battery measured at the liquid nitrogen temperature by the BJH method, and Z is a cumulative pore volume ($cm^3/g$) for which pore diameters are 2.6 nm or more and 50 nm or less among the pore volumes that are obtained by analyzing the nitrogen desorption isotherm of the positive electrode active material for the lithium secondary battery measured at the liquid nitrogen temperature by the BJH method.

7. The positive electrode active material for the lithium secondary battery according to claim 5 that is represented by a composition formula (I), $$Li[Li_a(Ni_{1-x-y}Co_xM_y)_{1-a}]O_2 \quad (I)$$

here, in the formula (I), M is at least one element selected from the group consisting of Fe, Cu, Mg, Mn, Al, W, B, Mo, Zn, Sn, Zr, Ga, La, Ti, Nb, and V and $-0.10 \le a \le 0.30$, $0 \le x \le 0.45$, and $0 \le y \le 0.45$ are satisfied.

8. The positive electrode active material for the lithium secondary battery according to claim 5, wherein a BET specific surface area is 0.3 $m^2/g$ or more and 4.0 $m^2/g$ or less.

9. The positive electrode active material for the lithium secondary battery according to claim 5, wherein a tap density is 1.0 $g/cm^3$ or more and 2.8 $g/cm^3$ or less.

10. A lithium secondary battery comprising:

the positive electrode active material for the lithium secondary battery according to claim 5.

11. The precursor according to claim 2, wherein a BET specific surface area is 1.0 $m^2/g$ or more and 25 $m^2/g$ or less.

12. The precursor according to claim 2, wherein a tap density is 0.8 $g/cm^3$ or more and 2.7 $g/cm^3$ or less.

13. The positive electrode active material for the lithium secondary battery according to claim 6 that is represented by a composition formula (I), $$Li[Li_a(Ni_{1-x-y}Co_xM_y)_{1-a}]O_2 \quad (I)$$

here, in the formula (I), M is at least one element selected from the group consisting of Fe, Cu, Mg, Mn, Al, W, B, Mo, Zn, Sn, Zr, Ga, La, Ti, Nb, and V and $-0.10 \le a \le 0.30$, $0 \le x \le 0.45$, and $0 \le y \le 0.45$ are satisfied.

14. The positive electrode active material for the lithium secondary battery according to claim 6, wherein a BET specific surface area is 0.3 $m^2/g$ or more and 4.0 $m^2/g$ or less.

15. The positive electrode active material for the lithium secondary battery according to claim 6, wherein a tap density is 1.0 $g/cm^3$ or more and 2.8 $g/cm^3$ or less.

16. A positive electrode for a lithium secondary battery, comprising:

the positive electrode active material for the lithium secondary battery according to claim 6.

17. A lithium secondary battery comprising:

the positive electrode for the lithium secondary battery according to claim 16.

18. The positive electrode active material for the lithium secondary battery according to claim 5, wherein M is at least one element selected from the group consisting of Fe, Cu, Mg, Al, W, B, Mo, Zn, Sn, Zr, Ga, La, Ti, Nb, and V, or M is at least one element selected from the group consisting of B, Mo, La, Ti, and Nb, or M is at least one element selected from the group consisting of Fe, Cu, Mg, Mn, Al, W, Zn, Sn, Zr, Ga, and V and at least one element selected from the group consisting of B, Mo, La, Ti, and Nb.

19. The precursor according to claim 1, wherein a cumulative pore volume for which pore diameters are 10 nm or more and 200 nm or less is 0.010 $cm^3/g$ or more and 0.08 $cm^3/g$ or less, and a cumulative pore specific surface area for which pore diameters are 10 nm or more and 200 nm or less is 0.80 $m^2/g$ or more and 10 $m^2/g$ or less.

20. The positive electrode active material for the lithium secondary battery according to claim 5, wherein a cumulative pore volume for which pore diameters are 10 nm or more and 200 nm or less is 0.002 $cm^3/g$ or more and 0.050 $cm^3/g$ or less, and a cumulative pore specific surface area for which the pore diameters are 10 nm or more and 200 nm or less is 0.20 $m^2/g$ or more and 2.5 $m^2/g$ or less.

* * * * *